(12) United States Patent
Zhang et al.

(10) Patent No.: US 12,549,096 B2
(45) Date of Patent: Feb. 10, 2026

(54) CONVERTER SYSTEM

(71) Applicant: Delta Electronics, Inc., Taipei (TW)

(72) Inventors: Chi Zhang, Durham, NC (US); Zhiyu Shen, Durham, NC (US); Peter Mantovanelli Barbosa, Durham, NC (US)

(73) Assignee: DELTA ELECTRONICS, INC., Taipei (TW)

( * ) Notice: Subject to any disclaimer, the term of this patent is extended or adjusted under 35 U.S.C. 154(b) by 220 days.

(21) Appl. No.: 18/407,794

(22) Filed: Jan. 9, 2024

(65) Prior Publication Data

US 2025/0226742 A1 Jul. 10, 2025

(51) Int. Cl.
*H02M 3/00* (2006.01)
*H02M 3/158* (2006.01)

(52) U.S. Cl.
CPC ............. *H02M 3/01* (2021.05); *H02M 3/158* (2013.01)

(58) Field of Classification Search
CPC ................................. H02M 3/158; H02M 3/01
See application file for complete search history.

(56) References Cited

U.S. PATENT DOCUMENTS

| | | | |
|---|---|---|---|
| 9,318,974 B2 | 4/2016 | Yoscovich et al. | |
| 10,673,353 B2 | 6/2020 | Drofenik et al. | |
| 11,101,734 B2 | 8/2021 | Lin et al. | |
| 11,152,854 B2 | 10/2021 | Das et al. | |
| 2018/0131291 A1* | 5/2018 | Lavieville | H02M 7/483 |
| 2020/0373851 A1* | 11/2020 | Wang | H02M 1/15 |
| 2021/0288581 A1 | 9/2021 | Zhu et al. | |
| 2021/0320587 A1* | 10/2021 | Yu | H02M 3/158 |
| 2021/0328523 A1* | 10/2021 | Chen | H02M 1/14 |
| 2022/0014086 A1* | 1/2022 | Ye | H02M 3/158 |

(Continued)

FOREIGN PATENT DOCUMENTS

| | | |
|---|---|---|
| CN | 106031011 A | 10/2016 |
| CN | 107181413 A | 9/2017 |
| CN | 113113920 B | 8/2023 |

OTHER PUBLICATIONS

Rodriguez, J. et al., "Multilevel Inverters: A Survey of Topologies, Controls, and Applications." IEEE Transactions on Industrial Electronics 49, No. 4 (Aug. 2002): 724-738.

(Continued)

*Primary Examiner* — Rafael O Leon De Domenech
(74) *Attorney, Agent, or Firm* — KIRTON McCONKIE; Evan R. Witt

(57) ABSTRACT

The present disclosure provides a converter system including a branch circuit and a controller. The branch circuit includes a top arm and a bottom arm electrically connected to each other. The top arm includes N cells and a top arm inductor. The bottom arm includes N' cells and a bottom arm inductor. The controller controls the converter system to operate in first, second and third modes through the plurality of control signal, wherein in the first mode, the voltage applied to the top arm inductor and the bottom arm inductor is substantial zero. In the second mode, the voltage applied to the top arm inductor and the bottom arm inductor is at least one cell voltage. In the third mode, at least one of the top arm inductor and the bottom arm inductor resonates with at least one capacitor in the top arm and the bottom arm.

12 Claims, 19 Drawing Sheets

(56) References Cited

U.S. PATENT DOCUMENTS

2022/0014110 A1* 1/2022 Ye .......................... H02M 3/07
2022/0247303 A1* 8/2022 Jin ...................... H02M 1/0095
2024/0079966 A1* 3/2024 Shuai ..................... H02M 7/49

OTHER PUBLICATIONS

Kouro, S. et al., "Recent Advances and Industrial Applications of Multilevel Converters." IEEE Transactions on Industrial Electronics 57, No. 8 (Aug. 2010): 2553-2580.
Malinowski, Mariusz, K Gopakumar, Jose Rodriguez, and Marcelo A Pérez. "A Survey on Cascaded Multilevel Inverters." IEEE Transactions on Industrial Electronics 57, No. 7 (Jul. 2010): 2197-2206.
Zhang, C. et al., "A Novel Three-level Phase-Shift Modulation for Serial Half Bridge LLC Resonant Converter," 2021 IEEE Applied Power Electronics Conference and Exposition (APEC), 2021, pp. 355-362.
Jang, Y. et al., "A new ZVS-PWM full-bridge converter," in IEEE Transactions on Power Electronics, vol. 18, No. 5, pp. 1122-1129, Sep. 2003.
Ahmed Elserougi et al., A hybrid half-bridge submodule-based DC-DC modular multilevel converter with a single bidirectional high-voltage valve, IET Generation, Transmission & Distribution, 2023, pp. 4146-4160.
Yuxiang Shi et al., Isolated Modular Multilevel DC-DC Converter With DC Fault Current Control Capability Based on Current—Fed Dual Active Bridge for MVDC Application, IEEE Transactions on Power Electronics, vol. 33, No. Mar. 3, 2018, pp. 2145-2161.

* cited by examiner t0 to t1 t1 to t2

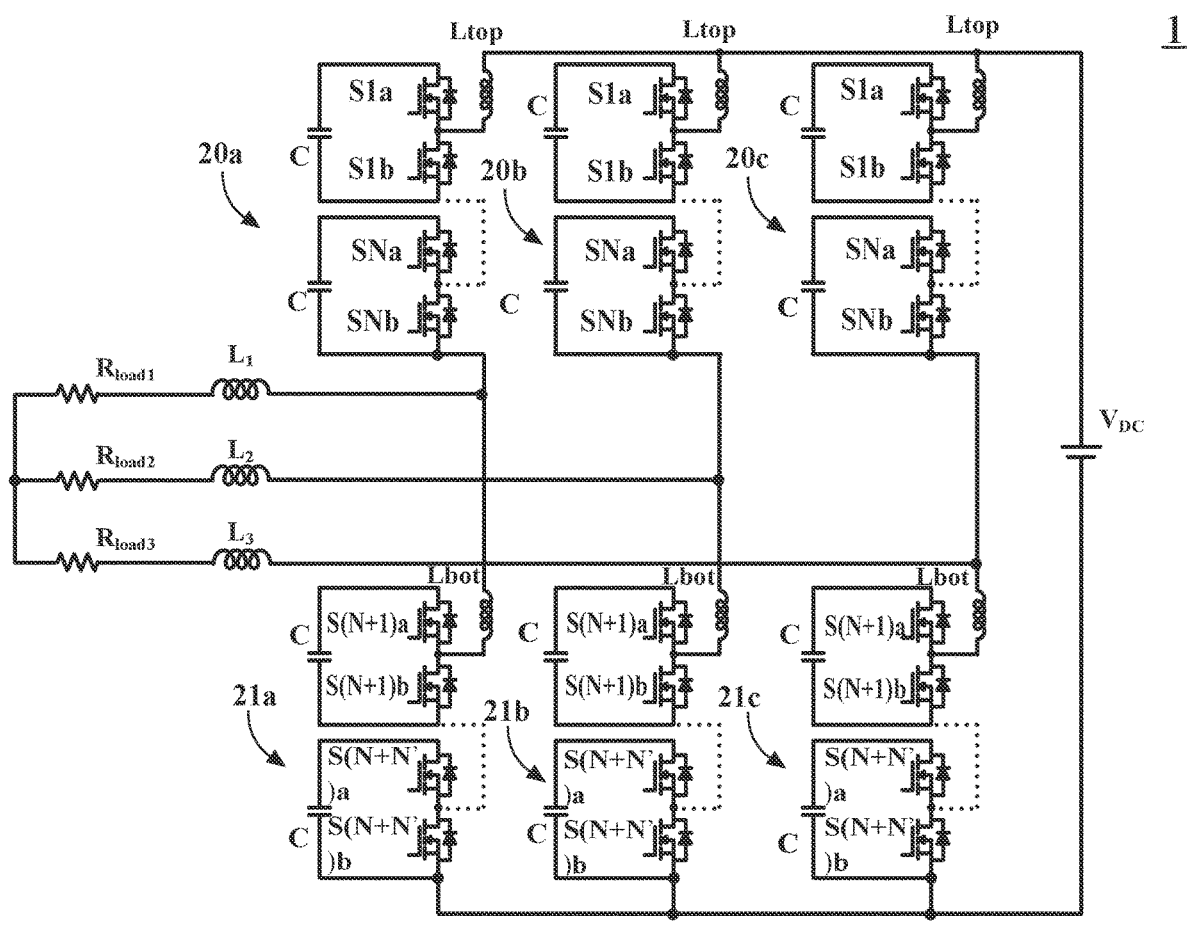
FIG. 14
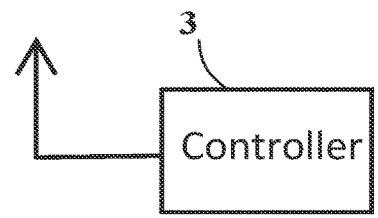

CONVERTER SYSTEM

FIELD OF THE INVENTION

The present disclosure relates to a converter system, and more particularly to a converter system capable of achieving zero voltage switching.

BACKGROUND OF THE INVENTION

Modular multilevel converters (MMC) are attracting attention in industry and academia as one of the preferred choices of electronic power conversion for high-power applications. MMC have successfully made their way into the industry and therefore can be considered a mature and proven technology. Currently, MMC technologies are commercialized in standard and are customized in products for providing a wide range of applications, such as compressors, pumps, grinding mills, reactive power compensation, marine propulsion, high-voltage direct-current (HVDC) transmission, wind energy conversion, railway traction, and solid-state transformers in references [1]-[3] below. Although it is an enabling and already proven technology, multilevel converters present a lot of challenges, such as reducing control complexity and achieving high efficiency.

One promising way to reduce the switching loss of semiconductors devices is to turn them on with zero voltage, so-called zero-voltage switching (ZVS). Many modern power electronics topologies employ ZVS to achieve very high conversion efficiency, such as LLC resonant converter and phase-shift full-bridge converter in prior arts (4)~(5) below. Therefore, it is demanding to apply the ZVS technique in MMC to further boost its efficiency.

REFERENCES

[1] Rodriguez, J., Jih-Sheng Lai, and Fang Zheng Peng. "Multilevel Inverters: A Survey of Topologies, Controls, and Applications." IEEE Transactions on Industrial Electronics 49, no. 4 (August 2002): 724-38.
[2] Kouro, S, M Malinowski, K Gopakumar, J Pou, L G Franquelo, Bin Wu, J Rodriguez, M A Pérez, and J I Leon. "Recent Advances and Industrial Applications of Multilevel Converters." IEEE Transactions on Industrial Electronics 57, no. 8 (August 2010): 2553-80.
[3] Malinowski, Mariusz, K Gopakumar, Jose Rodriguez, and Marcelo A Pérez. "A Survey on Cascaded Multilevel Inverters." IEEE Transactions on Industrial Electronics 57, no. 7 (July 2010): 2197-2206.
[4] C. Zhang, P. Barbosa, Z. Shen, and R. Wang, "A Novel Three-level Phase-Shift Modulation for Serial Half Bridge LLC Resonant Converter," 2021 IEEE Applied Power Electronics Conference and Exposition (APEC), Phoenix, AZ, USA, 2021, pp. 355-362.
[5] Yungtaek Jang, M. M. Jovanovic, and Yu-Ming Chang, "A new ZVS-PWM full-bridge converter," in IEEE Transactions on Power Electronics, vol. 18, no. 5, pp. 1122-1129 September 2003.

However, the prior art MMC or related circuit structure mentioned above fails to achieve ZVS for all switches during the switching transition.

Therefore, there is a need of providing a converter system to obviate the drawbacks encountered from the prior arts.

SUMMARY OF THE INVENTION

It is an object of the present disclosure to provide a converter system, and the controller of the converter system controls the converter system to operate in three different modulation schemes for allowing the switches to achieve ZVS. Therefore, the switching loss is reduced, and the conversion efficiency is increased.

In accordance with an aspect of the present disclosure, there is provided a converter system including a positive input terminal, a negative input terminal, a positive output terminal, a negative output terminal, a branch circuit, and a controller. The positive input terminal and the negative input terminal are configured to receive an input voltage. The positive output terminal and the negative output terminal are configured to provide an output voltage. The branch circuit includes a top arm and a bottom arm. The top arm includes N cells and a top arm inductor, wherein the top arm inductor is electrically connected to the positive input terminal and the N cells. Each of the N cells of the top arm includes a first switch, a second switch, and a capacitor connected in series and has a first node between the first switch and the second switch and a second node between the second switch and the capacitor. The second node of the n-th cell of the top arm is connected to the first node of the (n+1)-th cell of the top arm, and each of the N-cells of the top arm is configured to generate a cell voltage in each cell of the top arm. N is a positive integer, n is greater than or equal to 1 and is less than N, and the top arm inductor is electrically connected to the first node of the first cell of the top arm. The bottom arm includes N' cells and a bottom arm inductor. Each of the N' cells of the bottom arm includes a third switch, a fourth switch, and a capacitor connected in series and has a third node between the third switch and the fourth switch and a fourth node between the fourth switch and the capacitor. The third node of the n-th cell of the bottom arm is connected to the fourth node of the (n+1)-th cell of the bottom arm, and each of the N' cells of the bottom arm is configured to generate a cell voltage in each cell of the bottom arm. N' is a positive integer, n is greater than or equal to 1 and is less than N', and an end of the bottom arm inductor is electrically connected to the third node of the first cell of the bottom arm, and another end of the bottom arm inductor is electrically connected to the second node of the N-th cell of the top arm. The fourth node of the N'-th cell of the bottom arm is electrically connected to the negative input terminal, the positive output terminal and the negative output terminal are electrically connected to the second node of the N-th cell of the top arm, and the fourth node of the N'-th cell of the bottom arm respectively. The controller is configured to generate a plurality of control signals for controlling the switches in each cell in the top arm and the bottom arm respectively, wherein the controller is adapted to control the converter system to operate in first, second, and third modes through the plurality of control signal. In the first mode, the voltage applied to the top arm inductor and the bottom arm inductor is substantial zero, wherein in the second mode, the voltage applied to the top arm inductor and the bottom arm inductor is at least one cell voltage, wherein in the third mode, at least one of the top arm inductor and the bottom arm inductor resonates with at least one capacitor in the top arm and the bottom arm.

The above contents of the present invention will become more readily apparent to those ordinarily skilled in the art after reviewing the following detailed description and accompanying drawings, in which:

BRIEF DESCRIPTION OF THE DRAWINGS

FIG. 14 schematically shows a three-phase inverter applying the proposed modulation schemes in the half-bridge cascaded cells.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for the purpose of illustration and description only. It is not intended to be exhaustive or to be limited to the precise form disclosed.

Figure 1A:
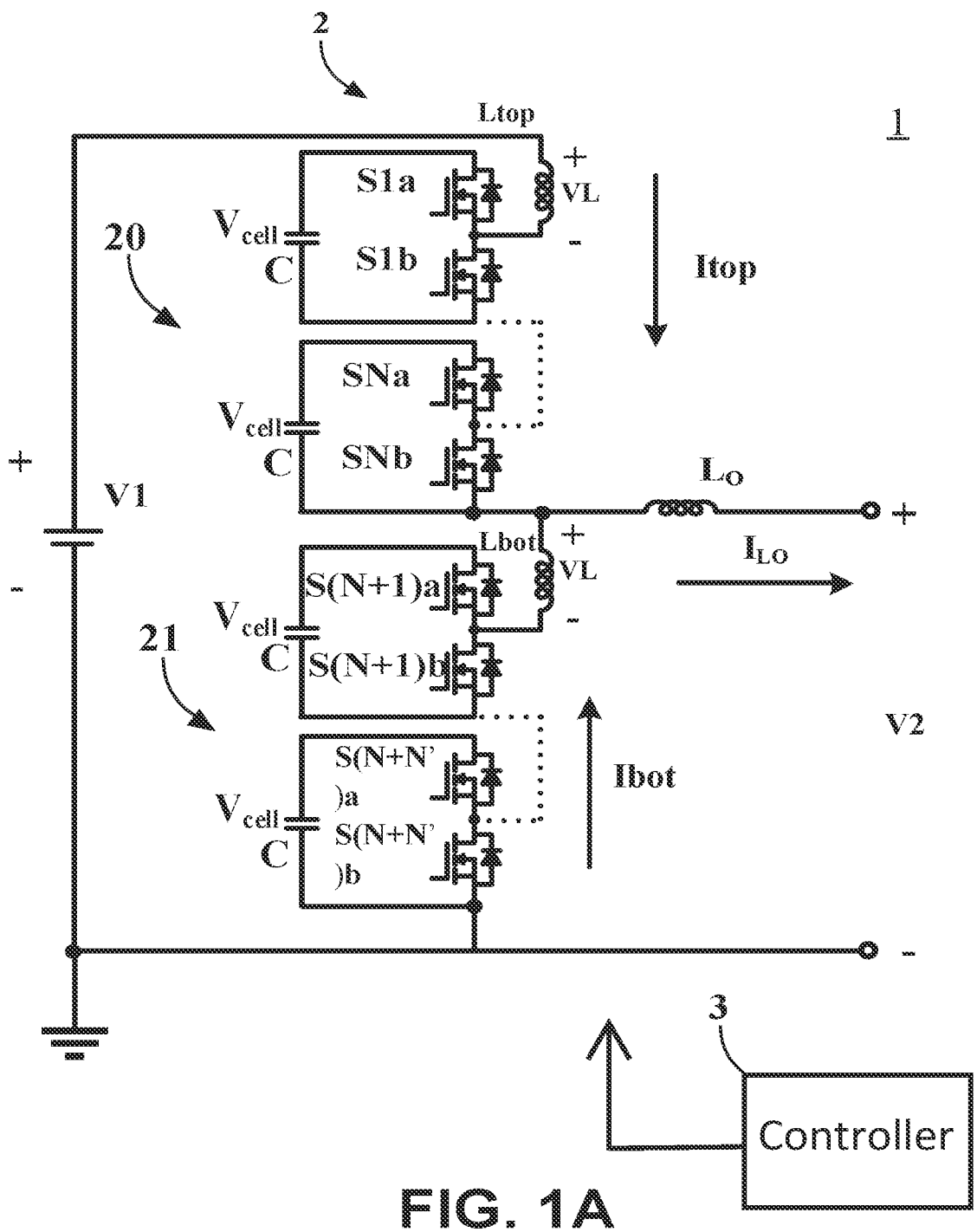
FIG. 1A schematically shows a converter system based on a multilevel phase leg.

FIG. 1A schematically shows a converter system 1 by using the MMC phase leg, where the MMC is achieved by cascading a total of N+N' HBC cells (N=1, 2, 3, . . . , and N'=1, 2, 3, . . . ). Due to the MMC structure, the converter system 1 can block very high input voltage as well as provide a high output voltage. Each HBC cell includes two conventional low-voltage switches and a local dc-link capacitor.

As shown in FIG. 1A, the converter system 1 includes a branch circuit 2, a controller 3, a positive input terminal V1+, a negative input terminal V1−, a positive output terminal V2+ and a negative output terminal V2−. The positive input terminal V1+ and the negative input terminal V1− are configured to receive an input voltage. The positive output terminal V2+ and the negative output terminal V2− are configured to provide an output voltage. The branch circuit 2 includes a top arm 20 and a bottom arm 21 electrically connected to each other. In this embodiment, the positive input terminal V1+ and the negative input terminal V1− connect to a DC source.

Figure 1B:
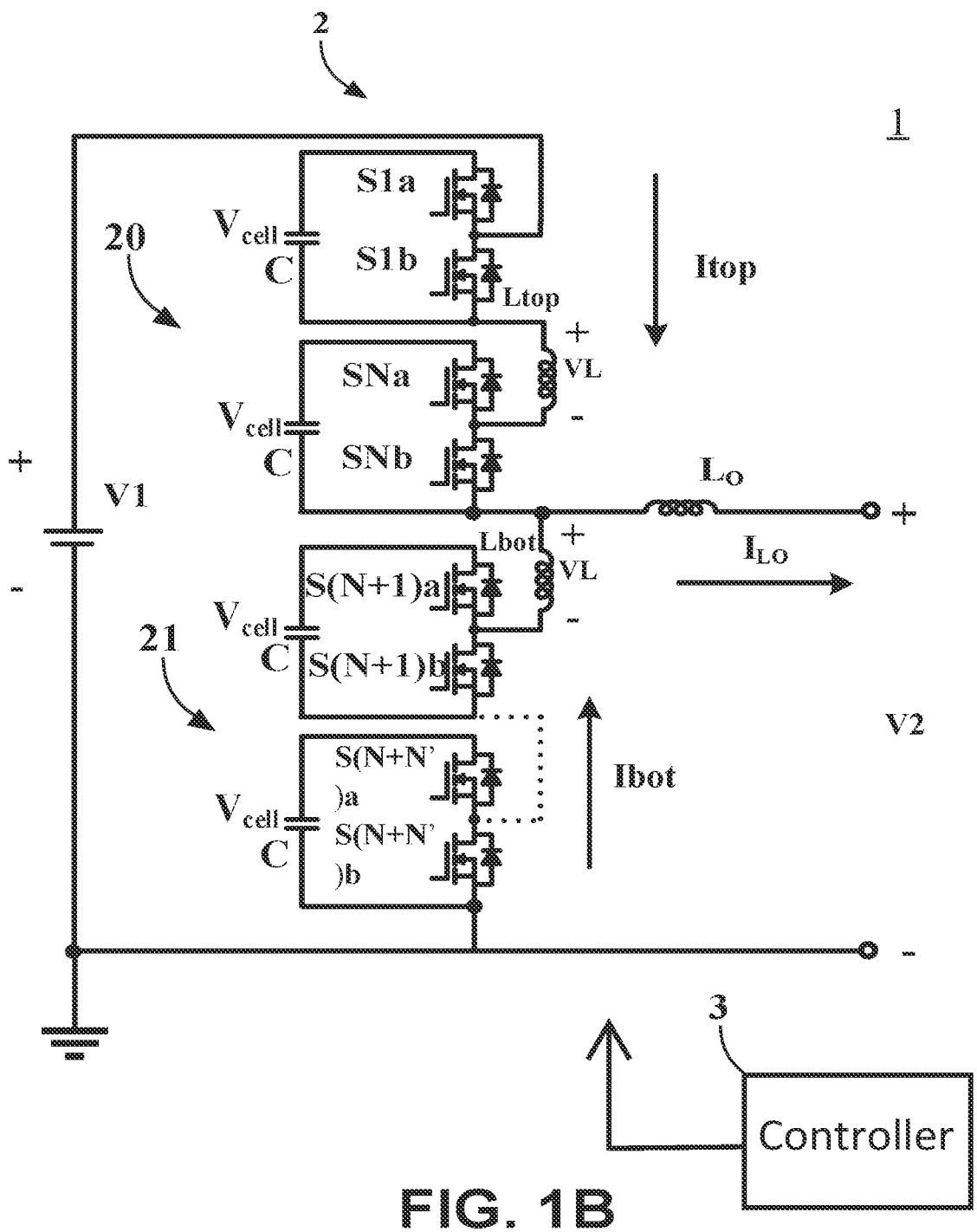
FIG. 1B schematically shows a converter system based on a multilevel phase leg with different position of the top arm inductor comparing to FIG. 1A.

The top arm 20 includes N cells and a top arm inductor Ltop. The top arm inductor Ltop is electrically connected to the positive input terminal V1+ and the N cells. It should be noted that the top arm inductor can be placed in various ways. For example, FIG. 1A shows that the top arm inductor Ltop is electrically connected to the positive input terminal V1+. The top arm inductor Ltop can be placed between cells, as shown in FIG. 1B. Each of the N cells of the top arm 20 includes a first switch (S1a, . . . , SNa), a second switch (S1b, . . . , SNb), and a capacitor C connected in series. In each cell, there is a first node between the first switch and the second switch, and there is a second node between the second switch and the capacitor. The second node of the n-th cell of the top arm 20 is connected to the first node of the (n+1)-th cell of the top arm 20, and each cell of the top arm 20 is configured to generate a cell voltage $V_{cell}$. N is an integer, and n is greater than or equal to 1 and less than N. The top arm inductor Ltop is electrically connected to the first node of the first cell of the top arm 20.

The bottom arm 21 includes N' cells and a bottom arm inductor Lbot. Each of the N' cells of the bottom arm 21 includes a third switch (S(N+1) a, . . . , S(N+N') a), a fourth switch (S(N+1) b, . . . , S(N+N') b) and a capacitor C connected in series. In each cell, there is a third node between the third switch and the fourth switch in each cell, and there is a fourth node between the fourth switch and the capacitor C. The third node of the n-th cell of the bottom arm 21 is connected to the fourth node of the (n+1)-th cell of the bottom arm 21, and each cell of the bottom arm 21 is configured to generate a cell voltage $V_{cell}$. N' is an integer, and n is greater than or equal to 1 and less than N'. An end of the bottom arm inductor Lbot is electrically connected to the third node of the first cell of the bottom arm 21, and another end of the bottom arm inductor Lbot is electrically connected to the second node of the N-th cell of the top arm 20. The fourth node of the N'-th cell of the bottom arm 21 is electrically connected to a negative input terminal. The positive output terminal V2+ and the negative output terminal V2− are electrically connected to the second node of the N-th cell of the top arm 20 and the fourth node of the N'-th cell of the bottom arm 21 respectively.

In an embodiment, N is equal to N', that is, an amount of the cells of the top arm 20 is equal to an amount of the cells of the bottom arm 21. In another embodiment, N is not equal to N', that is, an amount of the cells of the top arm 20 is not equal to an amount of the cells of the bottom arm 21.

The top arm inductor Ltop and the bottom arm inductor Lbot are realized either by a physical inductor or any form of parasitics. In an embodiment, the arm inductors can also be formed by parasitics, such as loop inductance between cells, and doesn't need to be a physical component.

Figure 2:
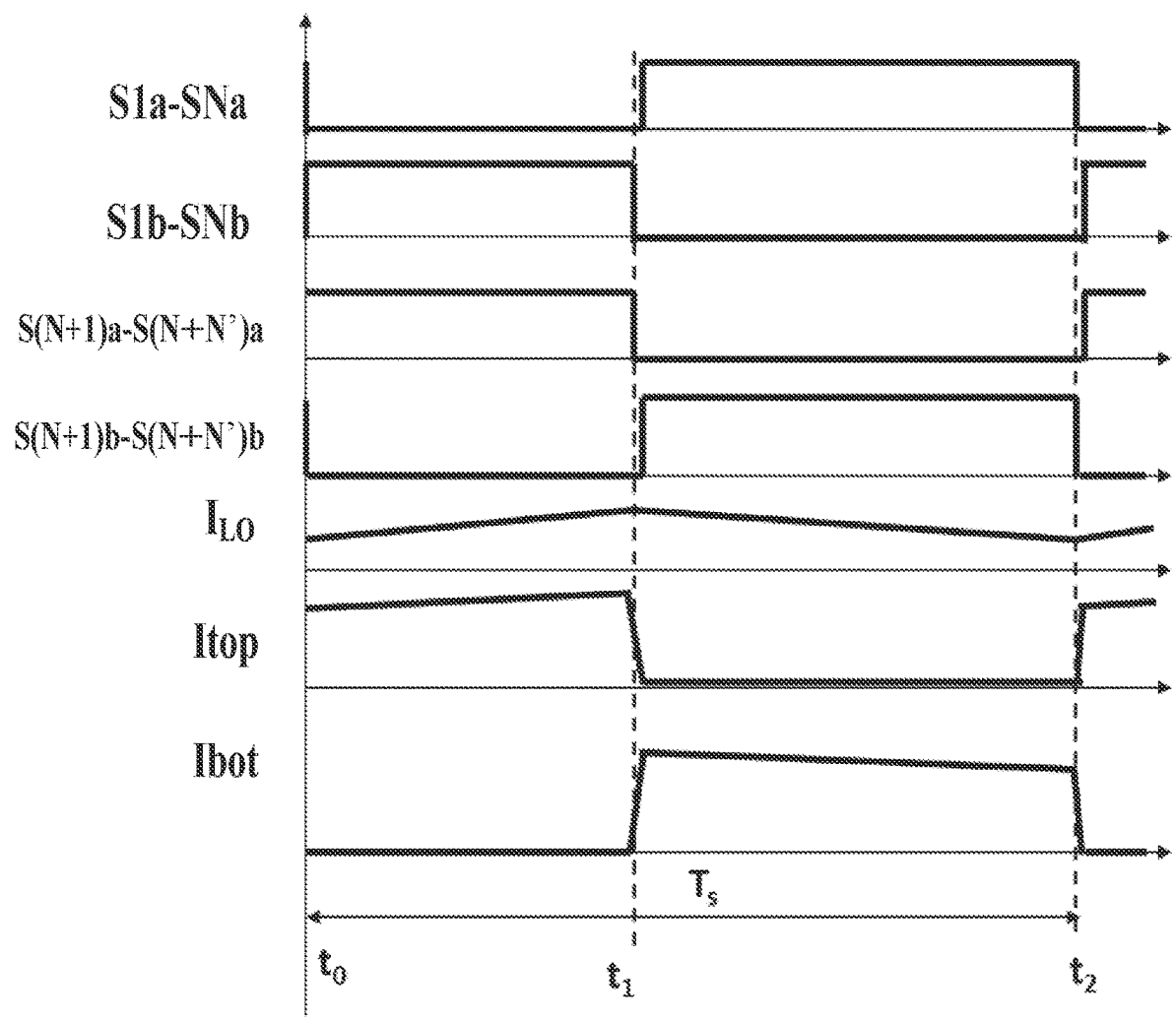
FIG. 2 schematically shows key waveforms of the converter system in FIG. 1A during a switching cycle with a conventional signal control method.

FIG. 2 schematically shows key waveforms of the converter system 1 in FIG. 1A during a switching cycle with a conventional signal control method. As shown in FIGS. 1 and 2, all switches operate in the same switching frequency $f_{sw}$. The first switch (S1a to SNa) of each HBC cell of the top arm 20 shares the same gate signal as the second switch (S(N+1) b to S(N+N') b) of each HBC cell of the bottom arm 21. The second switch (S1b to SNb) of each HBC cell of the top arm 20 has the same gate signal as the first switch (S(N+1) a to S2 (N+N') a) of each HBC cell of the bottom arm 21. Thus, the two switching arms behave effectively as two complementary high-voltage switches. From time t0 to t1, the voltage applied to the filter inductor $L_O$ is V1-V2, and the inductor current $I_{LO}$ increases linearly with a slope of $$\frac{V1 - V2}{L_O}.$$

From time t1 to t2, the voltage applied to the filter inductor $L_O$ becomes −V2, and the inductor current $I_{LO}$ reduces linearly with a slope of $$\frac{-V2}{L_O}.$$

Due to the voltage-second balance of the filter inductor $L_O$ at the steady state, the relationship between duty cycle D and output voltage V2 is given as V2=DVI, where D is the duty cycle of gate signals of the second switch (S1b to SNb) of each HBC cell in the top arm 20.

Figure 3A:
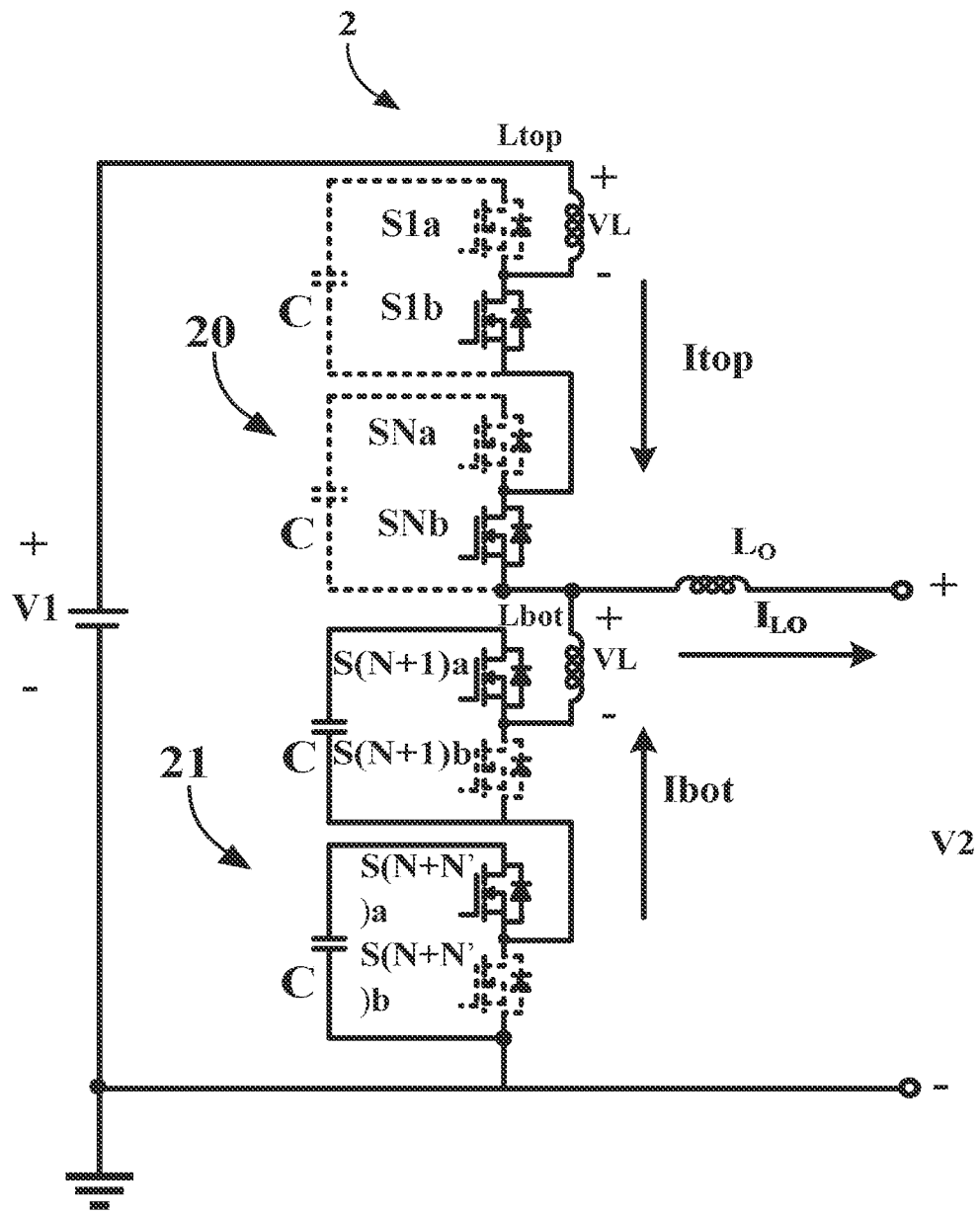
FIGS. 3A and 3B schematically show the topological stages of the converter system in FIG. 1A during a switching cycle with the conventional signal control method shown in FIG. 2.
Figure 3B:
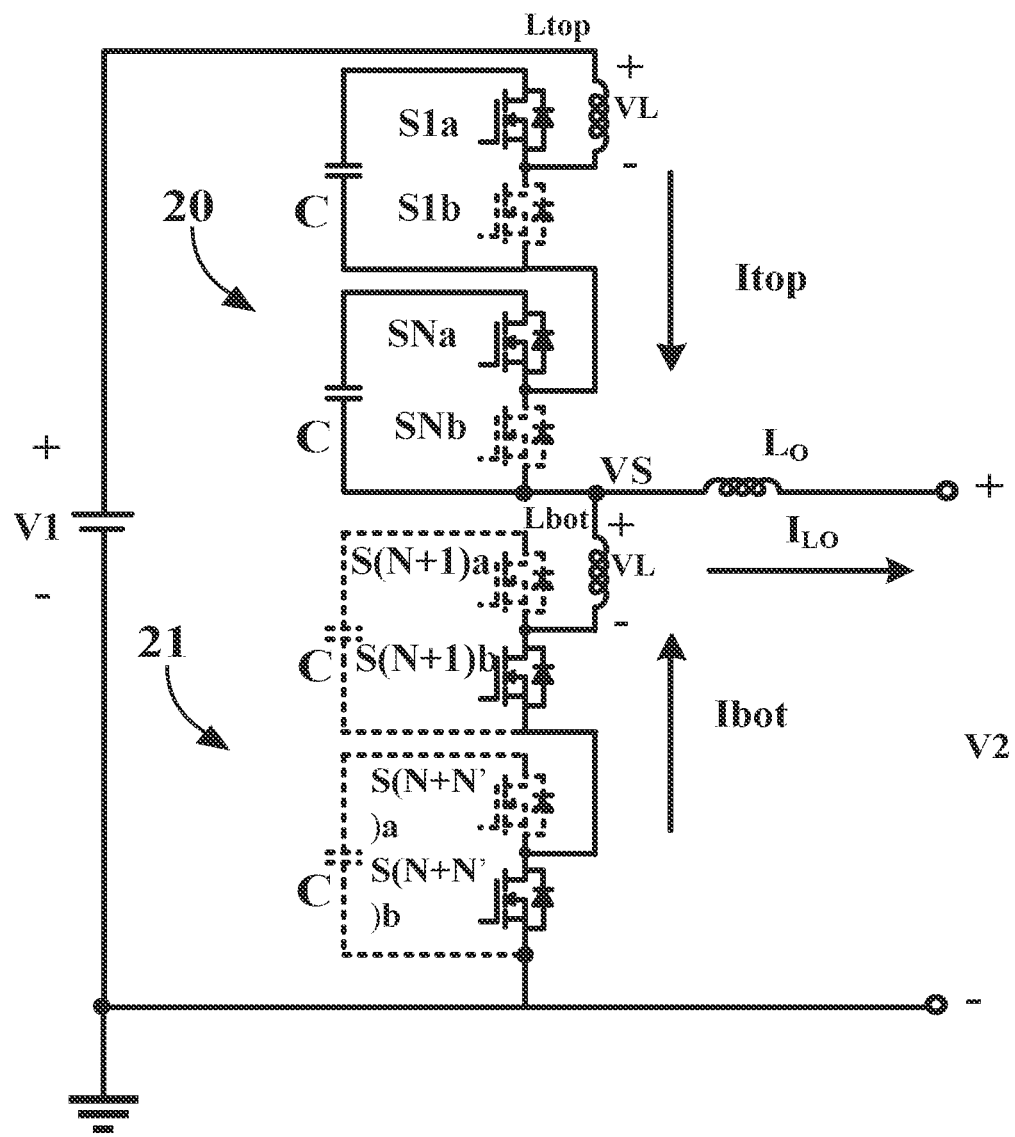

FIGS. 3A and 3B schematically show the topological stages of the converter system in FIG. 1A during a switching cycle with the conventional signal control method shown in FIG. 2. As shown in FIG. 3A, from time to to t1, the load current $I_{LO}$ flows through the second switches (S1b to SNb) of the top arm 20 whereas the bottom arm current Ibot is substantially zero. When the second switches (S1b to SNb) of the top arm 20 turn off at time t1, the top arm current Itop discharges the output capacitors of the first switches (S1a to SNa) of the top arm 20 to achieve ZVS. Meanwhile, the load current $I_{LO}$ also assists the ZVS of the second switches (S(N+1) b to S(N+N') b) of the bottom arm 21. As shown in FIG. 3B, from time t1 to t2, the load current $I_{LO}$ freewheels through the second switches (S(N+1) b to S(N+N') b) of the bottom arm 21, where the second switches (S(N+1) b to S(N+N') b) of the bottom arm 21 operate as the synchronous rectifier.

When the second switches (S(N+1) b to S(N+N') b) of the bottom arm 21 turn off at time t2, the load current $I_{LO}$ continuously flows through the body diodes of the second switches (S(N+1) b to S(N+N') b) in the bottom arm 20. After a small deadtime, the first switches (S(N+1) a to S(N+N') a) of the bottom arm 21 turn on with hard switching, which generates substantial switching loss. Meanwhile, the second switches (S1b to SNb) of the top arm 20 turn on with full voltage and a small current. Because of the hard switching of the first switches (S(N+1) a to S(N+N') a) of the bottom arm 21 and the second switches (S1b to SNb) of the top arm 20 at time t2, the converter system may suffer poor efficiency.

To realize ZVS operations of all switches during the switching transition for higher efficiency, a novel modulation scheme is proposed in the present disclosure.

Please refer to FIG. 1A again, in the modulation scheme proposed in the present application, controller 3 is configured to generate a plurality of control signals for controlling all the switches of the top arm 20 and the bottom arm 21 respectively. The controller 3 is adapted to control the converter system 1 to operate in the first, second, and third modes through the plurality of control signals. In the first mode, the voltage applied to the top arm inductor Ltop and the bottom arm inductor Lbot is substantially zero. In the second mode, the voltage applied to the top arm inductor Ltop and the bottom arm inductor Lbot is at least one cell voltage $V_{cell}$. In the third mode, at least one of the top arm inductor Ltop and the bottom arm inductor Lbot resonates with at least one capacitor C in the top arm 20 and the bottom arm 21.

Figure 4:
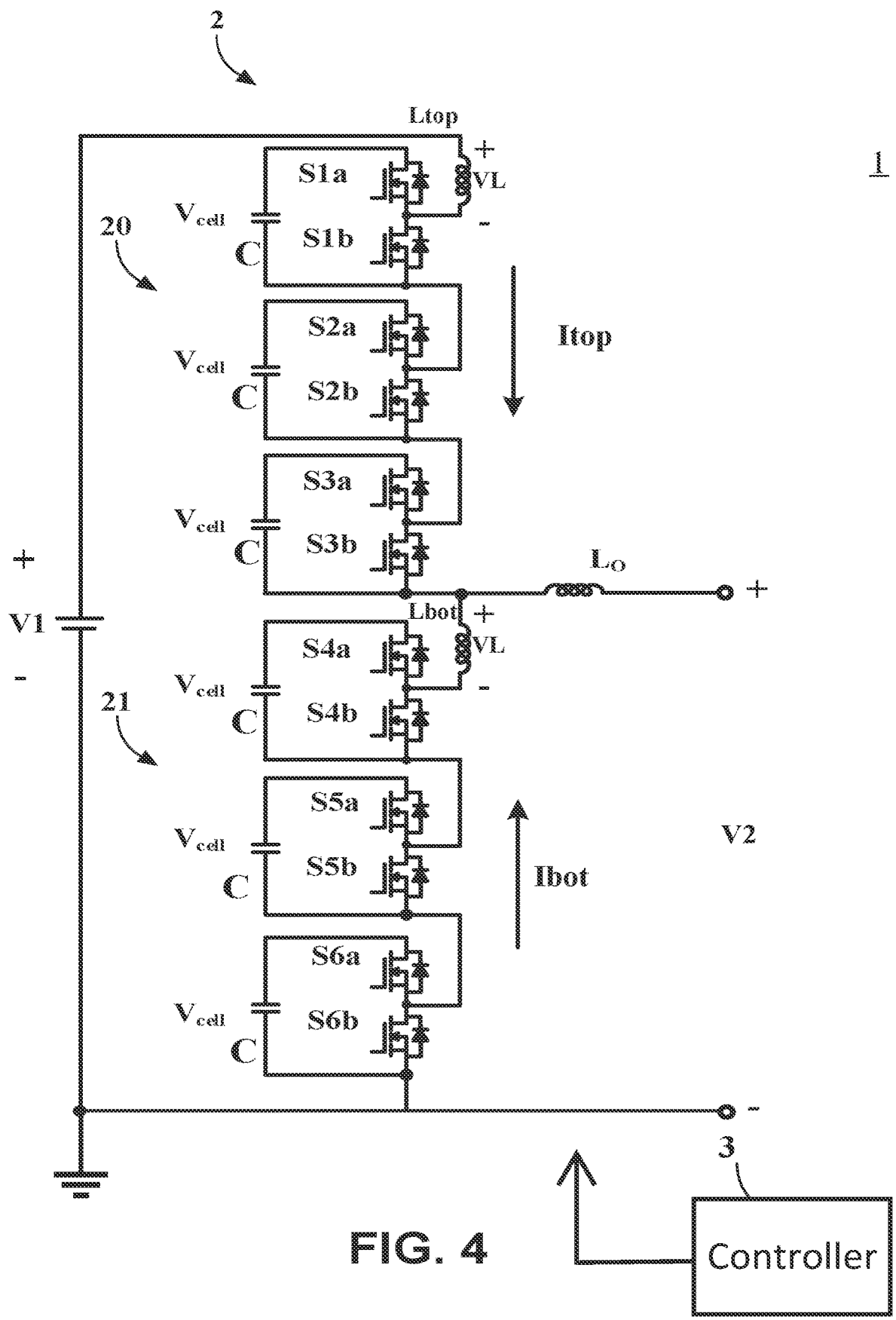
FIG. 4 schematically shows a converter system based on three half-bridge cascaded (HBC) cells in both the top arm and the bottom arm.
Figure 5:
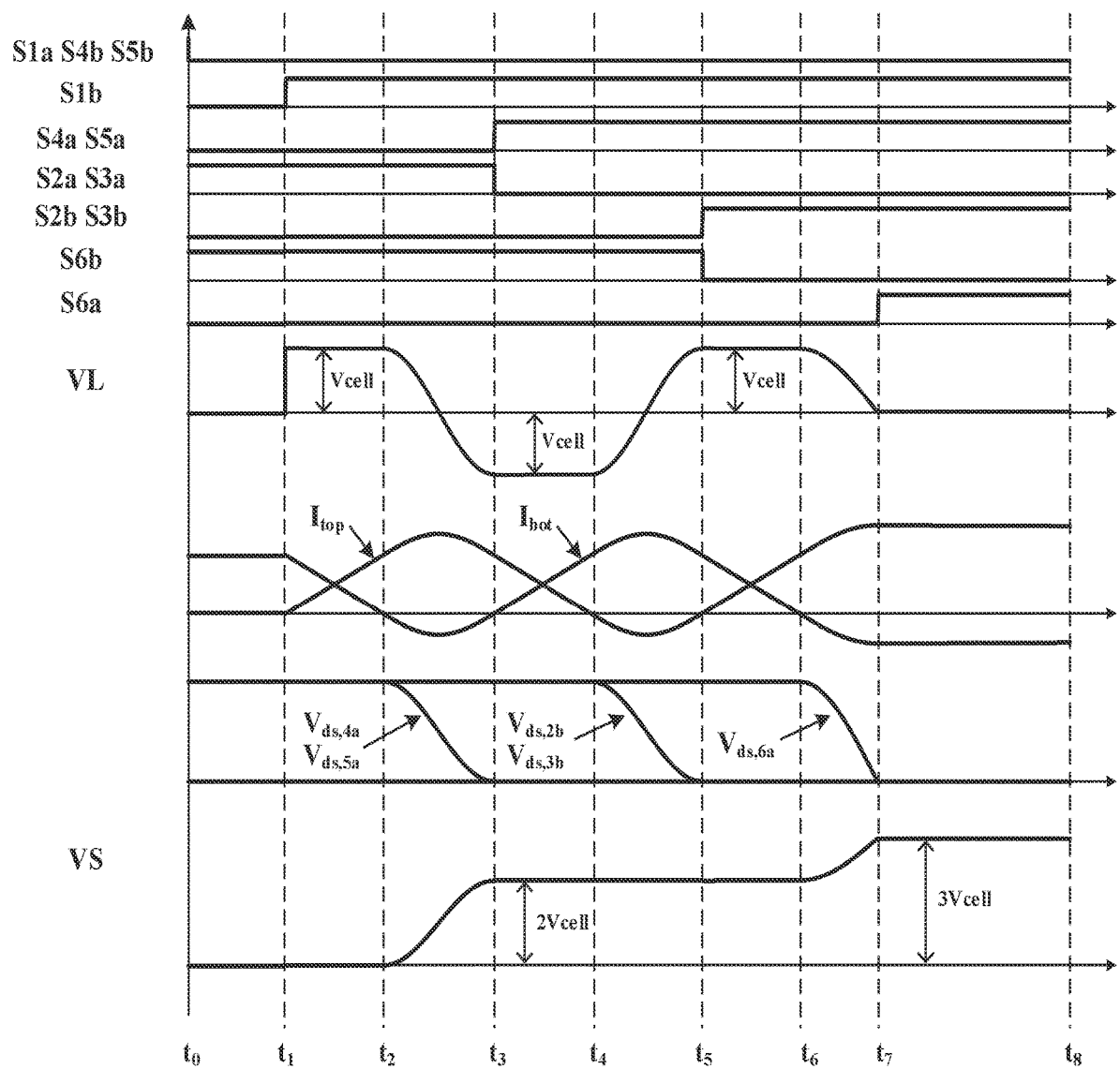
FIG. 5 schematically shows key waveforms of the converter system in FIG. 4 during a switching transition under the proposed symmetrical modulation scheme according to an embodiment of the present invention.

To simplify and facilitate the analysis, the modulation scheme is firstly implemented in a converter system shown in FIG. 4 with three cells in the top arm 20 and three cells in the bottom arm 21. FIG. 5 schematically shows the key waveforms during the switching transition under the proposed symmetrical modulation scheme. It should be noted that the converter system 1 still operates as a normal converter system with a predefined duty cycle D. The proposed modulation scheme is only applied for the ZVS operation during the switching transition where hard switching would normally occur under the conventional modulation scheme shown in FIG. 2. In the conventional modulation scheme, the first switches S1a, S2a, and S3a of the top arm 20 and the second switches S4b S5b, and S6b of the bottom arm 21 turn off at time to simultaneously in FIG. 2. However, in the proposed modulation scheme shown in FIG. 5, only switches S1a, S4b, and S5b turn off at time t0. As analyzed before, the top arm current Itop remains zero from time t0 to t1, and the bottom arm current Ibot continuously freewheels through the body diodes of the switches S4b and S5b. The voltage VL applied to the inductors is substantially zero. After a small deadtime, the switch S1b turns on at time t1 with zero current and the voltage VL suddenly increases to one cell voltage $V_{cell}$. From time t1 to t2, the bottom arm current Ibot reduces linearly with a slope of $$\frac{V_{cell}}{L_{top} + L_{bot}},$$

and the top arm current Itop increases linearly with the same slope. After the bottom arm current Ibot reduces to zero at time t2, both the top and bottom inductors Ltop and Lbot start to resonate with the capacitors C of the cell where the switches S4a and S5a are located in.

When the drain-source voltages $V_{ds,4a}$ and $V_{ds,5a}$ of the switches S4a and S5a reduce to zero, the switches S4a and S5a turn on with zero voltage at t3. Because of the resonance, the voltage VL reduces from positive voltage $V_{cell}$ at time t2 to negative voltage $V_{cell}$ at time t3 whereas the phase leg output voltage VS increases to two cell voltage at time t3.

As a result, the bottom arm current Ibot increases linearly with a slope of $$\frac{V_{cell}}{L_{top} + L_{bot}},$$

and the top arm current Itop reduces linearly with the same slope from time t3 to t4. After the top arm current Itop reduces to zero at time t4, both the top and bottom inductors Ltop and Lbot start to resonate with the capacitors C of the cell where the switches S2b and S3b are located in. When the drain-source voltages $V_{ds,2b}$ and $V_{ds,3b}$ of the switches S2b and S3b reduce to zero, the switches S2b and S3b turn on with zero voltage at time t5. Because of the resonance, the voltage VL increases from negative voltage $V_{cell}$ at time t4 to positive voltage $V_{cell}$ at time t5. As a result, the bottom arm current Ibot reduces linearly with a slope of $$\frac{V_{cell}}{L_{top}+L_{bot}},$$

and the top arm current Itop increases linearly with the same slope from time t5 to t6. After the bottom arm current Ibot reduces to zero at time t6, both top and bottom inductors Ltop and Lbot start to resonate with the capacitor of the cell where the switch S6a is located in. Because of the resonance, the voltage VL reduces from positive voltage $V_{cell}$ at time t6 to zero at time t7 whereas the phase leg output voltage VS further increases to three cell voltage at time t7. Finally, the switch S6a turns on with zero voltage at time t7 and the switching transition completes. During the whole switching transition under the proposed modulation, the switch S1b turns on with zero current, and the switches S2b, S3b, S4a, S5a, and S6a turn on with zero voltage. Therefore, the switching loss is reduced, and the converter efficiency is increased. It should be noted that switch S1b is the first switch that turns on to initiate the whole transition process and is also the only switch that does not achieve ZVS. To balance the switching stress, the next transition process can be triggered by turning on the switch S2b while the subsequent transition process will be started by turning on the switch S3b. By rotating the initial switch between switches S1b, S2b and S3b, the stress can be well balanced among the switches. Table 1 shows an example of the rotating sequence, wherein case 1 is shown in FIG. 5. By rotating case 1, case 2, case 3 and case 1, the system will operate in a more balanced manner.

| | First to switch | Second to switch | Third to switch | Last to switch |
|---|---|---|---|---|
| Case 1 | S1b | S4a, S5a, S2a, S3a | S2b, S3b, S6b | S6a |
| Case 2 | S2b | S5a, S6a, S3a, S1a | S3b, S1b, S4b | S4a |
| Case 3 | S3b | S6a, S4a, S1a, S2a | S1b, S2b, S5b | S5a |

In an embodiment, the second switch of one of the cells of the top arm 20 is the first switch to switch. The first switches of the two cells of the bottom arm 21 and the first switches of the two cells of the top arm 20 are the second switches to switch. The second switches of the two cells of the top arm 20 and the second switch one of the cells of the bottom arm 21 are the third switches to switch. The first switch of one of the cells of the bottom arm 21 is the last switch to switch.

In this embodiment, the second switch S1b of the first cell of the top arm 20 is the first switch to switch. The first switch S4a of the first cell of the bottom arm 21, the first switch S5a of the second cell of the bottom arm 21, the first switch S2a of the second cell of the top arm 20 and the first switch S3a of the third cell of the top arm 20 are the second switches to switch. The second switch S2b of the first cell of the top arm 20, the second switch S3b of the first cell of the top arm 21 and the second switch S6b of the third cell of the bottom arm 21 are the third switches to switch. The first switch S6a of the third cell of the bottom arm 21 is the last switch to switch.

It should be noted that the converter system 1 operates in three different modes under the proposed modulation. Before and after the switching transition, the converter system 1 operates in the first mode where the voltage applied to the top arm inductor Ltop and the bottom arm inductor Lbot is substantially zero. From time t1 to t2, t3 to t4, and t5 to t6, the converter system 1 operates in the second mode where the magnitude of the voltage applied to the top arm inductor Ltop and the bottom arm inductor Lbot is one cell voltage. From time t2 to t3, t4 to t5, and t6 to t7, the converter system 1 operates in the third mode where the arm inductors resonate with at least one capacitor in the arms.

The voltage VL can also be expressed as:

$$VL = \begin{cases} 0, & t_0 < t < t_1 \\ V_{cell}, & t_1 < t < t_2 \\ V_{cell} \cos \omega 1(t - t_2), & t_2 < t < t_3 \\ -V_{cell}, & t_3 < t < t_4 \\ -V_{cell} \cos \omega 1(t - t_4), & t_4 < t < t_5 \\ V_{cell}, & t_5 < t < t_6 \\ V_{cell} \cos \omega 2(t - t_6), & t_6 < t < t_7 \\ 0, & t_7 < t < t_8 \end{cases}$$

In the second mode, because the voltage magnitude is one cell voltage for both positive and negative directions, this method is also named the symmetrical modulation scheme. However, the voltage level should not be limited to one cell voltage. It can be extended to any multiple times of one cell voltage.

The convert system 1 of the present disclosure may be a buck convert, a boost converter or a bidirectional converter. In the embodiment shown in FIG. 4, when V1+ and V1− are the positive input terminal and the negative input terminal respectively, and the V2+ and V2− are positive output terminal and the negative output terminal respectively, the converter system 1 of FIG. 4 is a buck converter, in this embodiment, the converter system 1 further includes a LC filter to form the buck converter. In another embodiment, when V1+ and V1− are the positive output terminal and the negative output terminal respectively, and the V2+ and V2− are positive input terminal and the negative input terminal respectively, the converter system 1 is a boost converter, in this embodiment, the converter system 1 further includes an inductor and an output capacitor to form the boost converter. In another embodiment, when the converter system 1 is a directional converter, V1+ and V2+ can be the positive input terminal or the positive output terminal according to actual needs, and V1− and V2− can be the negative input terminal or the negative output terminal according to actual needs.

Figure 6:
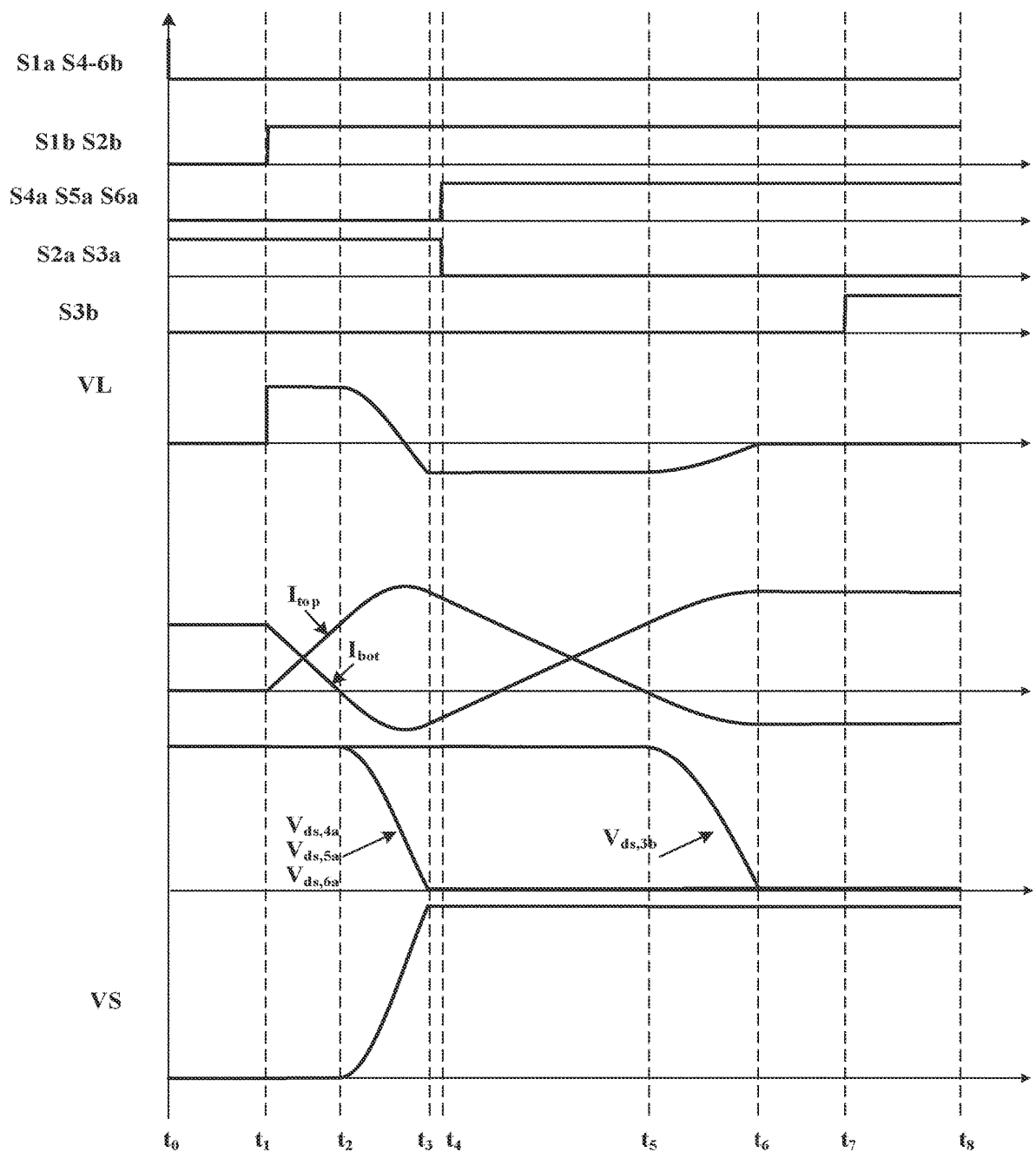
FIG. 6 schematically shows key waveforms of the converter system in FIG. 4 during a switching transition under the proposed asymmetrical modulation scheme according to an embodiment of the present invention.

FIG. 6 schematically shows another implementation of the proposed modulation scheme according to one embodiment. Similarly, the converter system 1 operates as a normal converter system with a predefined duty cycle D. The proposed modulation scheme is only applied for the ZVS operation during the switching transition where hard switching would normally occur under the conventional modulation schemes shown in FIG. 2. In the conventional modulation scheme, the first switches S1a S2a, and S3a of the top arm 20 and the second switches S4b, S5b, and S6b of the bottom arm 21 turn off at time to simultaneously in FIG. 2. However, in the proposed modulation scheme shown in FIG. 6, the switches S1a, S4b, S5b, and S6b turn off at time t0. As analyzed before, the top arm current Itop remains zero from time t0 to t1, and the bottom arm current Ibot continuously freewheels through the body diodes of the switches S4b, S5b, and S6b. The voltage VL applied to the inductors is substantially zero. After a small deadtime, the switches Sb and S2b turn on with zero current and the voltage VL suddenly increases to two cell voltage $2V_{cell}$ at time t1. From time t1 to t2, the bottom arm current Ibot reduces linearly with a slope of $$\frac{2V_{cell}}{L_{top}+L_{bot}}$$

and the top arm current Itop increases linearly with the same slope. After the bottom arm current Ibot reduces to zero at time t2, both top and bottom inductors Ltop and Lbot start to resonate with the capacitors C of the cell where the switches S4a, S5a, and S6a are located in.

When the drain-source voltages $V_{ds,4a}$, $V_{ds,5a}$, and $V_{ds,6a}$ of the switches S4a, S5a, and S6a reduce to zero at time t3, the switches S4a, S5a, and S6a turn on with zero voltage at time t4. Because of the resonance, the voltage VL reduces from positive voltage $2V_{cell}$ at time t2 to negative voltage $V_{cell}$ at time t3 whereas the phase leg output voltage VS increases to three cell voltage at time t3.

As a result, the bottom arm current Ibot increases linearly with a slope of $$\frac{V_{cell}}{L_{top}+L_{bot}},$$

and the top arm current Itop reduces linearly with the same slope from time t3 to t5. After the top arm current Itop reduces to zero at time t5, both top and bottom inductors Ltop and Lbot start to resonate with the capacitor of the cell where the switch S3b is located in. When the drain-source voltages $V_{ds,3b}$ of the switch S3b reduce to zero at time t6, the switch S3b turns on with zero voltage at time t7 to complete the switching transition. During the whole switching transition under the proposed modulation, the switches S1b and S2b turn on with zero current and the switches S3b, S4a, S5a, and S6a turn on with zero voltage. Therefore, the switching loss is reduced, and the converter efficiency is increased. It should be noted that the switches S1b and S2b are the first two switches that turn on to initiate the whole transition process and are also the switches that do not achieve ZVS. To balance the switching stress, the next transition process can be triggered by turning on the switches S2b and S3b while the subsequent transition process will be started by turning on the switches S3b and S1b. By rotating the initial switch between pairs of the switches S1b, S2b, and S3b, the stress can be well balanced among the switches.

It should be noted that the converter also operates in three different modes under the proposed modulation. Before and after the switching transition, the converter system 1 operates in the first mode where the voltage VL applied to the top arm inductor Ltop and the bottom arm inductor Lbot is substantially zero. From time t1 to t2 and t3 to t5, the converter system 1 operates in the second mode where the magnitude of the voltage VL applied to the top arm inductor Ltop and the bottom arm inductor Lbot is at least one cell voltage. From time t2 to t3 and t5 to t6, the converter system 1 operates in the third mode where the arm inductors resonate with at least one capacitor in the top arm and the bottom arm.

The voltage VL can also be expressed as:

$$VL = \begin{cases} 0, & t_0 < t < t_1 \\ 2V_{cell}, & t_1 < t < t_2 \\ V_{cell}\cos\omega1(t-t_2), & t_2 < t < t_3 \\ -V_{cell}, & t_3 < t < t_4 \\ -V_{cell}, & t_4 < t < t_5 \\ -V_{cell}\cos\omega2(t-t_5), & t_5 < t < t_6 \\ 0, & t_6 < t < t_7 \\ 0, & t_7 < t < t_8 \end{cases}$$

In the second mode, because the voltage magnitude is two cell voltage from time t1 to t2 and one negative cell voltage from time t3 to t5, this method is named the asymmetrical modulation scheme. However, the voltage level should not be limited to this specific example. It can be extended to any combination of any multiple of the cell voltage.

The proposed method can not only be applied in the converter shown in FIG. 4 with three HBC cells in each arm but can also be extended to any number of cells in cascaded.

Figure 7:
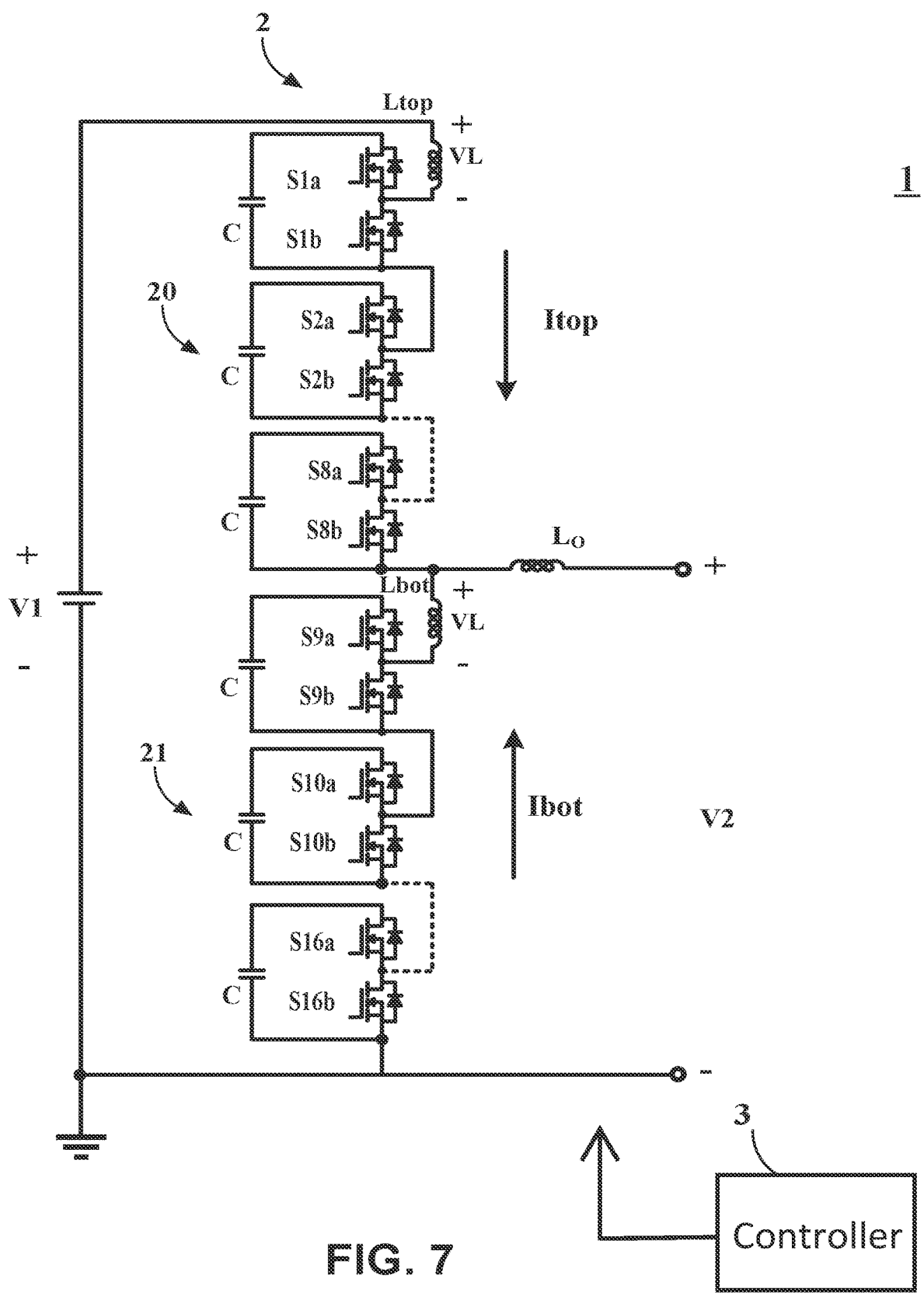
FIG. 7 schematically shows a converter system based on a total of eight half-bridge cascaded cells in both the top arm and the bottom arm.
Figure 8:
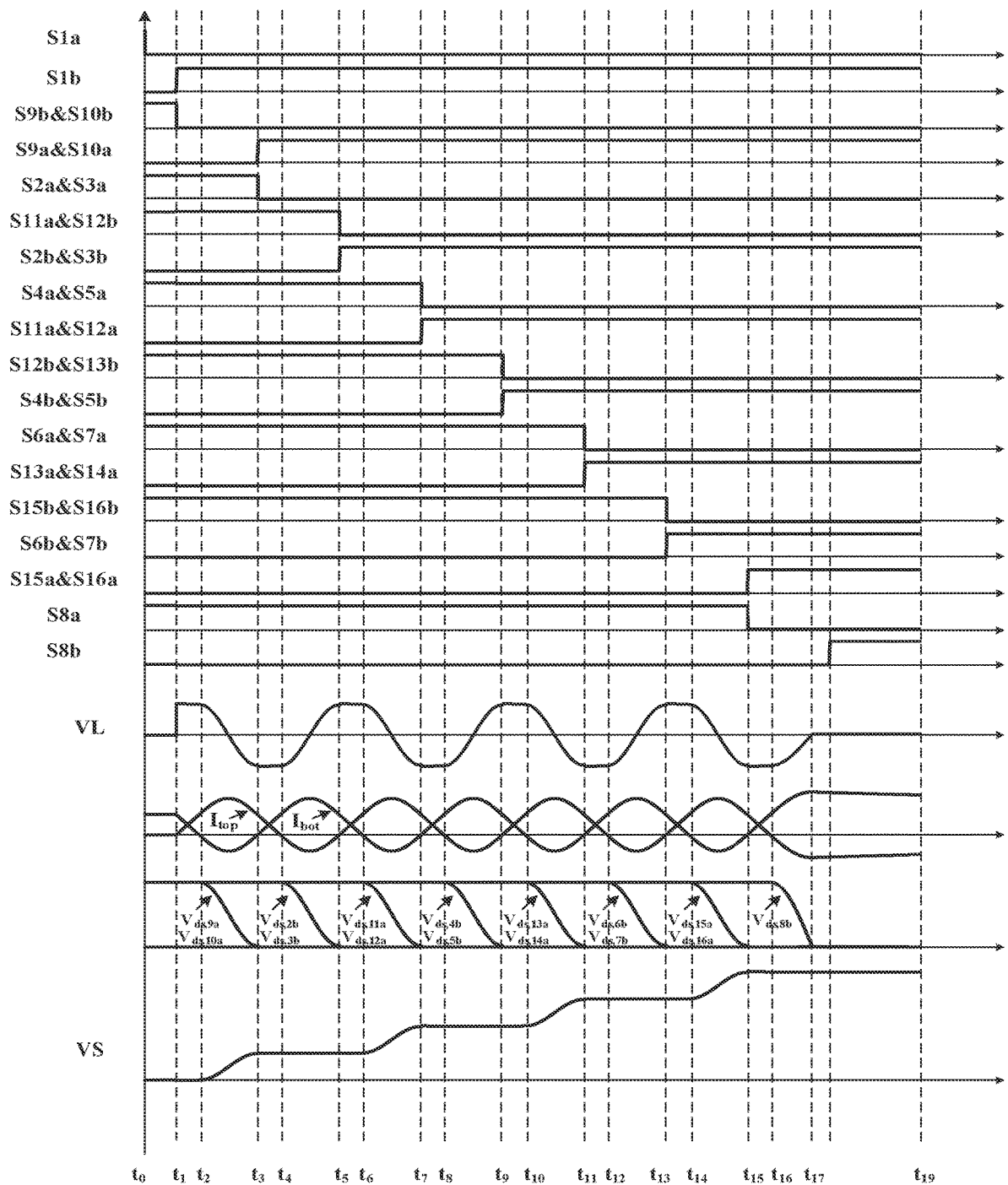
FIG. 8 schematically shows the key waveforms of the converter system in FIG. 7 during a switching transition under the proposed symmetrical modulation scheme according to an embodiment of the present invention.

FIG. 7 schematically shows a converter system with a total of eight HBC cells in each arm. FIG. 8 schematically shows the key waveforms under the proposed symmetrical modulation scheme. The circuit structures and operations of the converter system 1 shown in FIG. 7 are as described above, and the detailed descriptions thereof are omitted herein. It can be seen that the converter system operates in three different modes. Before and after the switching transition, the converter system operates in the first mode where the voltage applied to the arm inductors Ltop and Lbot is substantially zero. From time t1 to t2, t3 to t4, t5 to t6, t7 to t8, t9 to t10, t11 to t12, t13 to t14, and t15 to t16, the converter system 1 operates in the second mode where the magnitude of the voltage applied to the arm inductors Ltop and Lbot is one cell voltage. Again, the magnitude of the voltage can be any multiple of cell voltage. From time t2 to t3, t4 to t5, t6 to t7, t8 to t9, t10 to t11, t12 to t13, t14 to t15, and t16 to t17, the converter system 1 operates in the third mode where the arm inductors resonate with at least one capacitor in the top arm and the bottom arm.

Figure 9A:
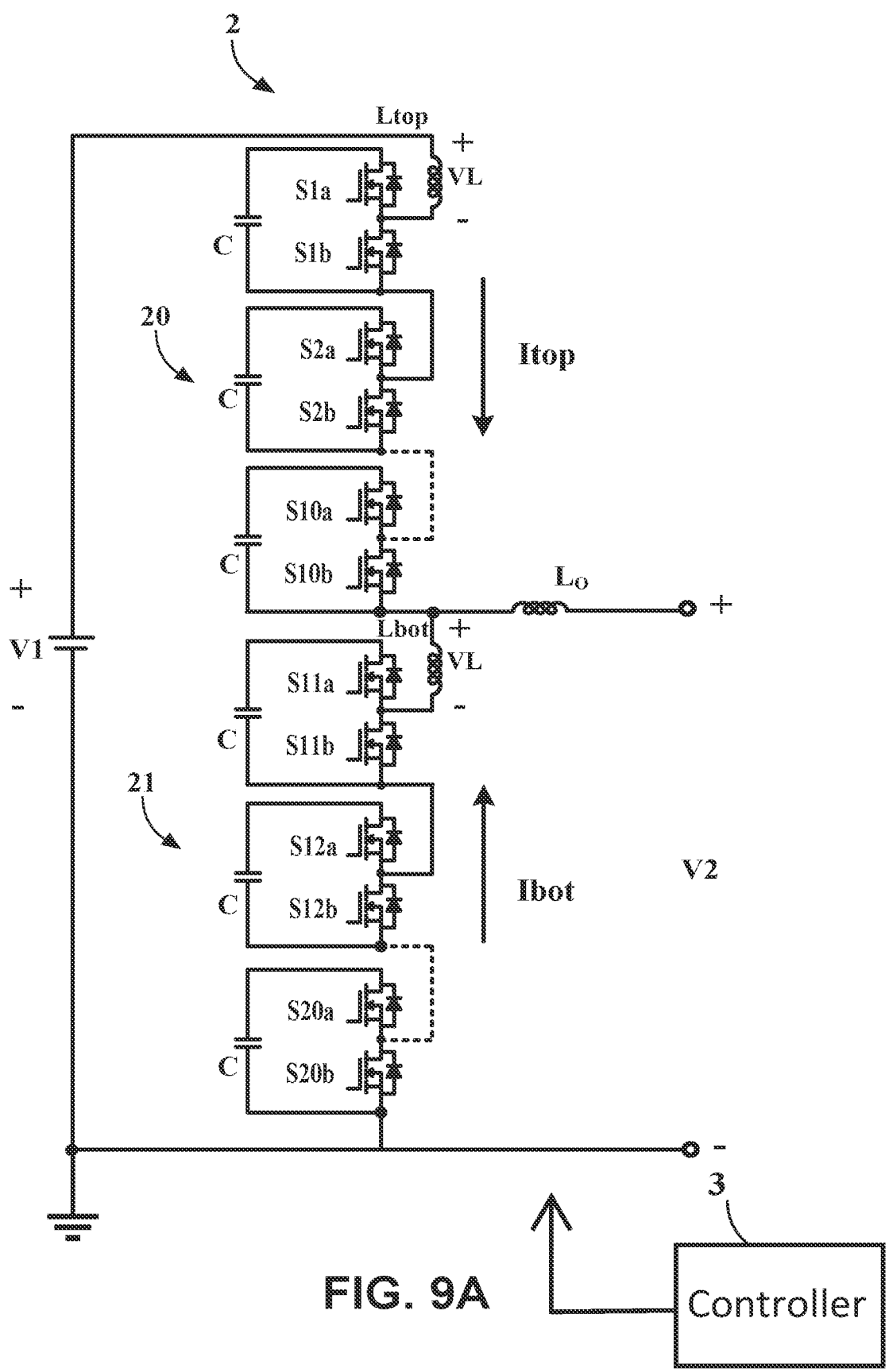
FIG. 9A schematically shows a converter system based on a total of ten half-bridge cascaded cells in both the top arm and the bottom arm.
Figure 10:
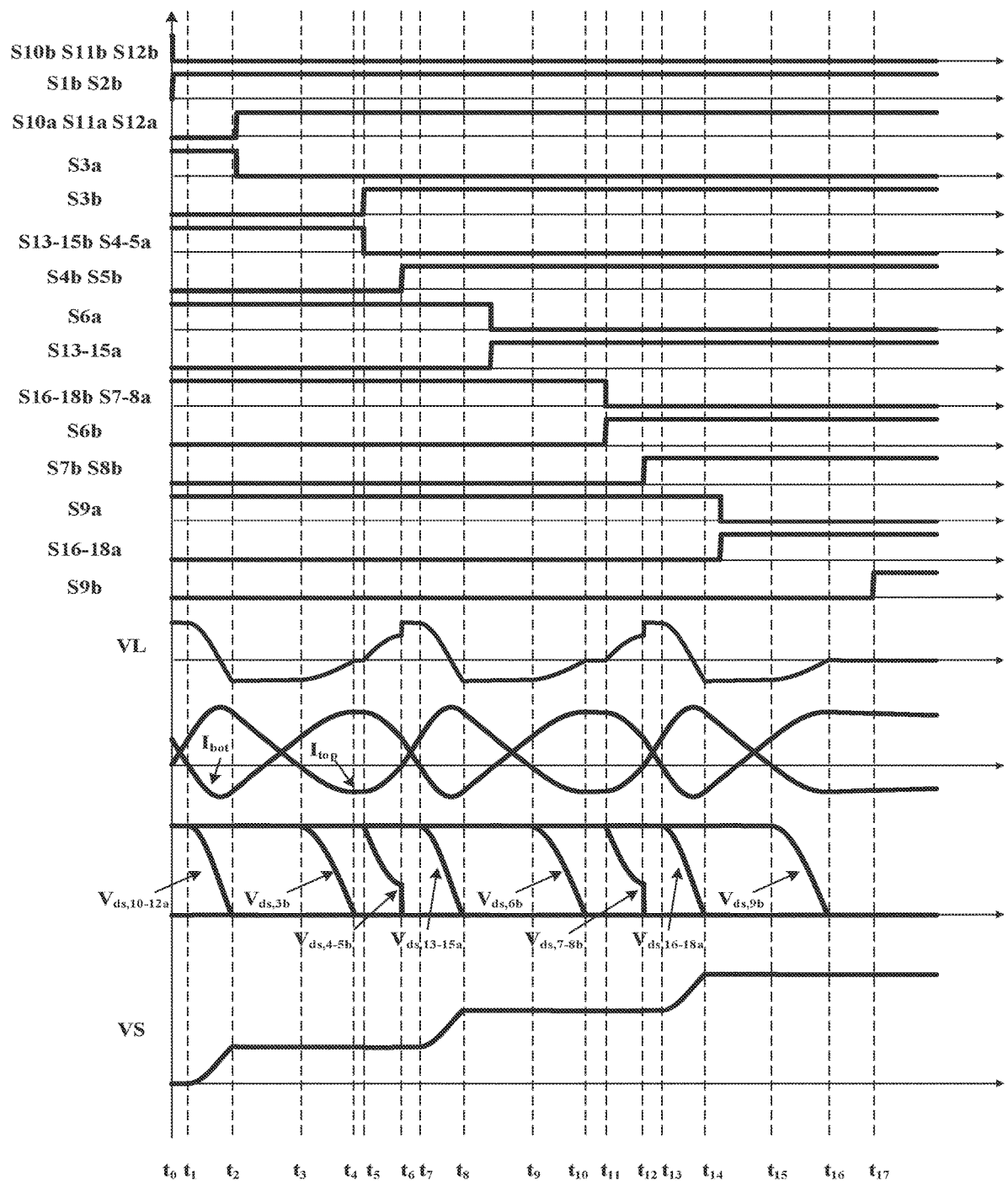
FIG. 10 schematically shows key waveforms of the converter system in FIG. 9A during a switching transition under the proposed asymmetrical modulation scheme according to an embodiment of the present invention.

FIG. 9A schematically shows a converter system with a total of ten HBC cells in each arm. The circuit structures and operations of the converter system 1 shown in FIG. 9A are as described above, and the detailed descriptions thereof are omitted herein. FIG. 10 schematically shows the key waveforms under the proposed asymmetrical modulation scheme. It can be seen that the converter system 1 operates in three different modes. Before and after the switching transition, the converter system 1 operates in the first mode where the voltage applied to the arm inductors is substantially zero. The converter system 1 also operates in the first mode from time t4 to t5 and t10 to t11 during the transition. From time to to t1, t2 to t3, t6 to t7, t8 to t9, t12 to t13, and t14 to t15, the converter system 1 operates in the second mode where the magnitude of the voltage applied to the arm inductors is at least one cell voltage. Again, the magnitude of the voltage can be any combination of any multiple of cell voltage. From time t1 to t2, t3 to t4, t5 to t6, t7 to t8, t9 to t10, t11 to t12, t13 to t14, and t15 to t16, the converter system operates in the third mode where the arm inductors resonate with at least one capacitor in the top arm and the bottom arm.

It should be noted that the proposed modulation scheme of the present disclosure is only analyzed in a converter system for simplicity, but it should not be limited only to a converter system. Indeed, the proposed modulation scheme can also enable the ZVS of the HBC cells in any topology where the MMC phase leg is used.

Figure 9B:
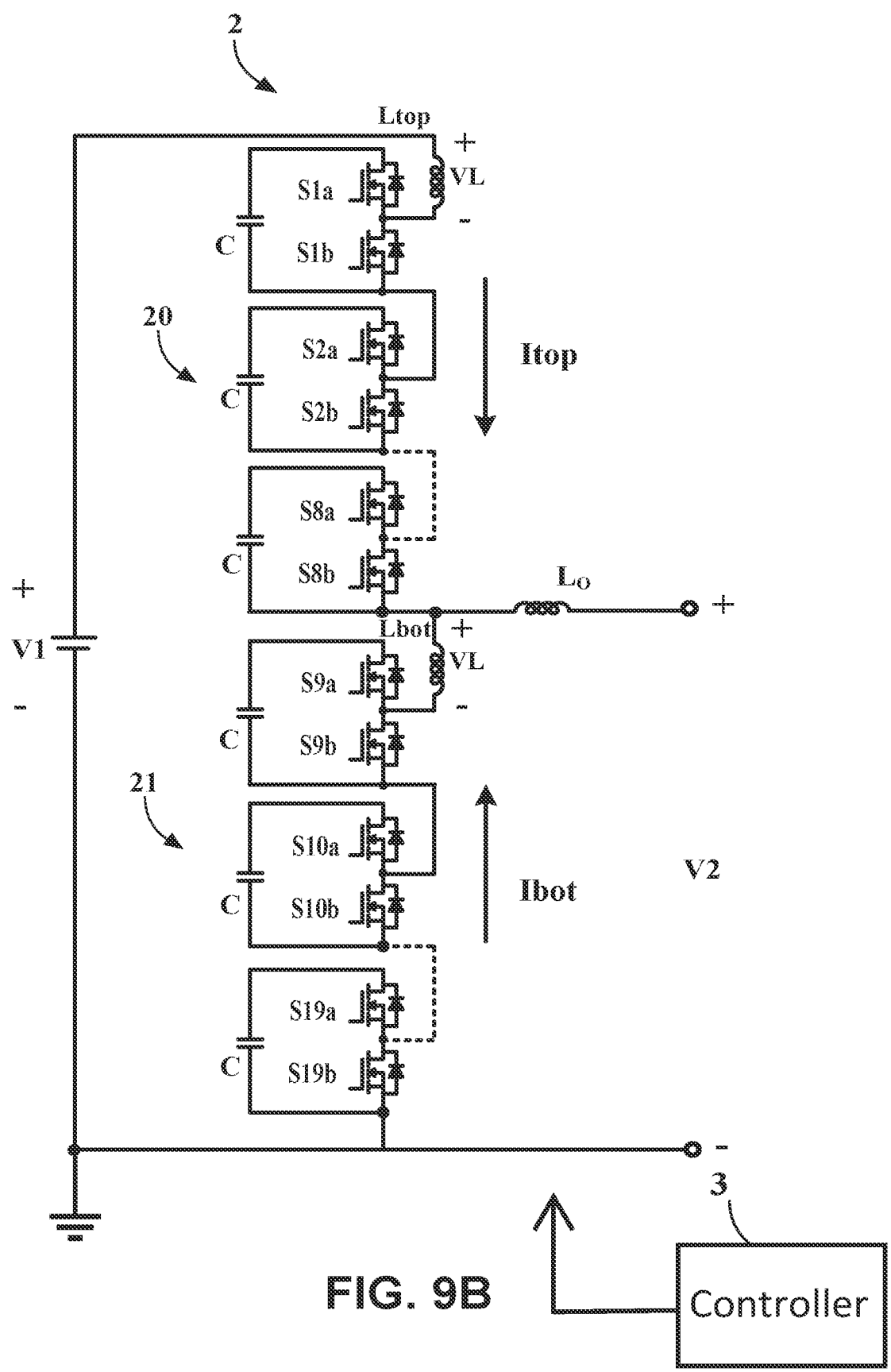
FIG. 9B schematically shows a converter system based on a total of eight half-bridge cascaded cells in the top arm and a total of eleven half-bridge cascaded cells in the bottom arm.

In an embodiment, the number of the HBC cells in each arm is not limited to ten as FIG. 9A. The number of HBC cells in the top arm 20 and the number of HBC cells in the bottom arm 21 may be the same or different according to actual requirements, and is not limited in the present disclosure. FIG. 9B schematically shows a converter system based on a total of eight half-bridge cascaded cells in the top arm 20 and a total of eleven half-bridge cascaded cells in the bottom arm 21. In an embodiment, the number of the top arm 20 and the bottom arm 21 are not limited and may be adjusted according to actual requirements.

Figure 11A:
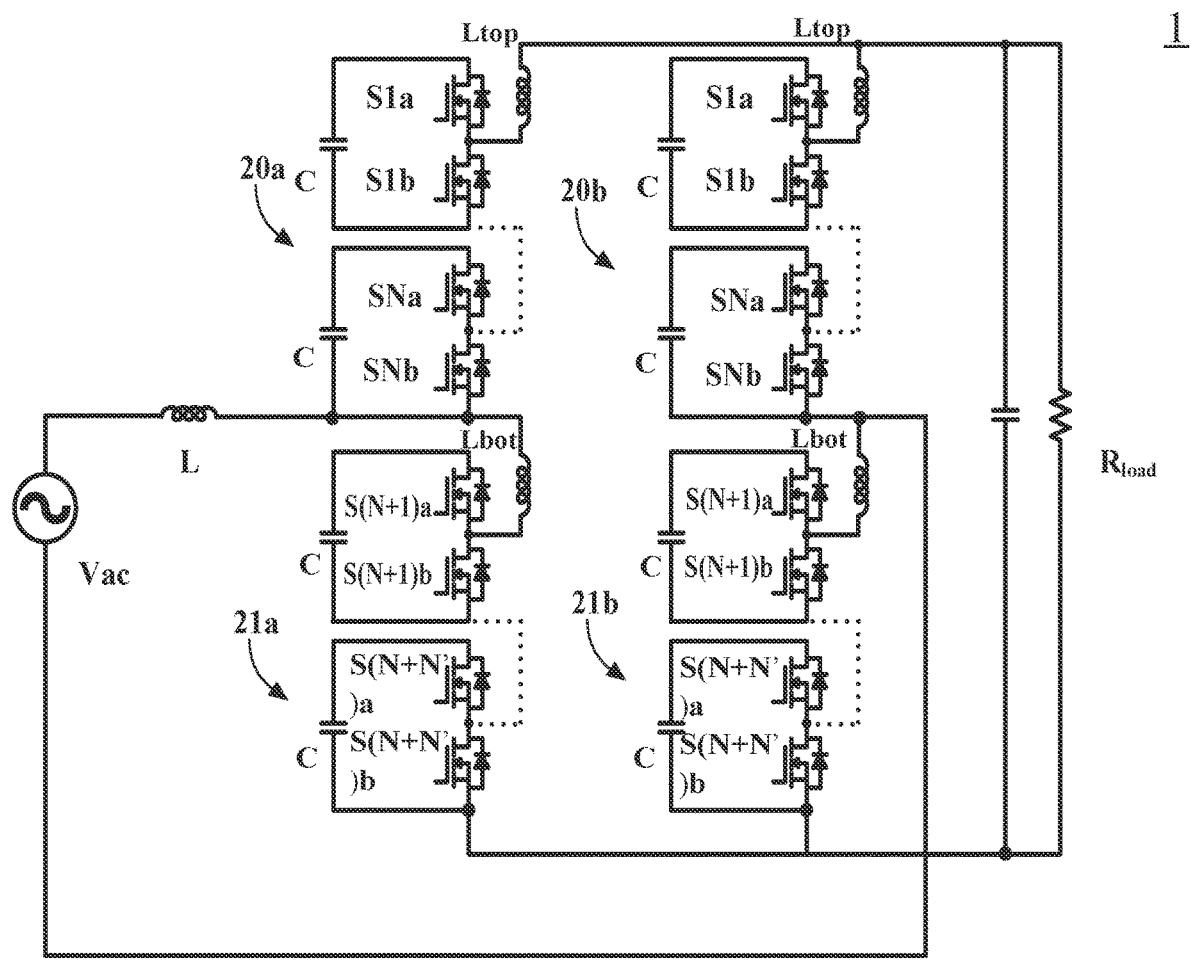
FIG. 11A schematically shows a single-phase power factor correction rectifier applying the proposed modulation schemes in the half-bridge cascaded cells.
Figure 11A:
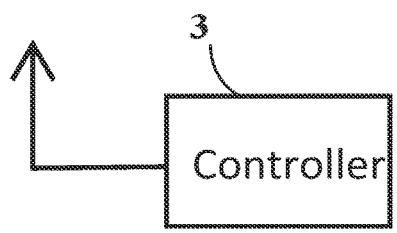

FIG. 11A schematically shows a single-phase PFC circuit where two MMC phase legs are used to block high voltage. In FIG. 11A, the converter system 1 includes two top arms 20a and 20b and two bottom arms 21a and 21b. The circuit structures and operations of the converter system, the top arms, and the bottom arms shown in FIG. 11A are as described above, and the detailed descriptions thereof are omitted herein. The top arms 20a and 20b are connected in series, the bottom arms 21a and 21b are connected in series, and the bottom arm inductor of the bottom arm 21a and the bottom arm inductor of the bottom arm 21b are electrically connected to an AC load Vac, and the converter system 1 in FIG. 11A is a power factor correction circuit.

Figure 11B:
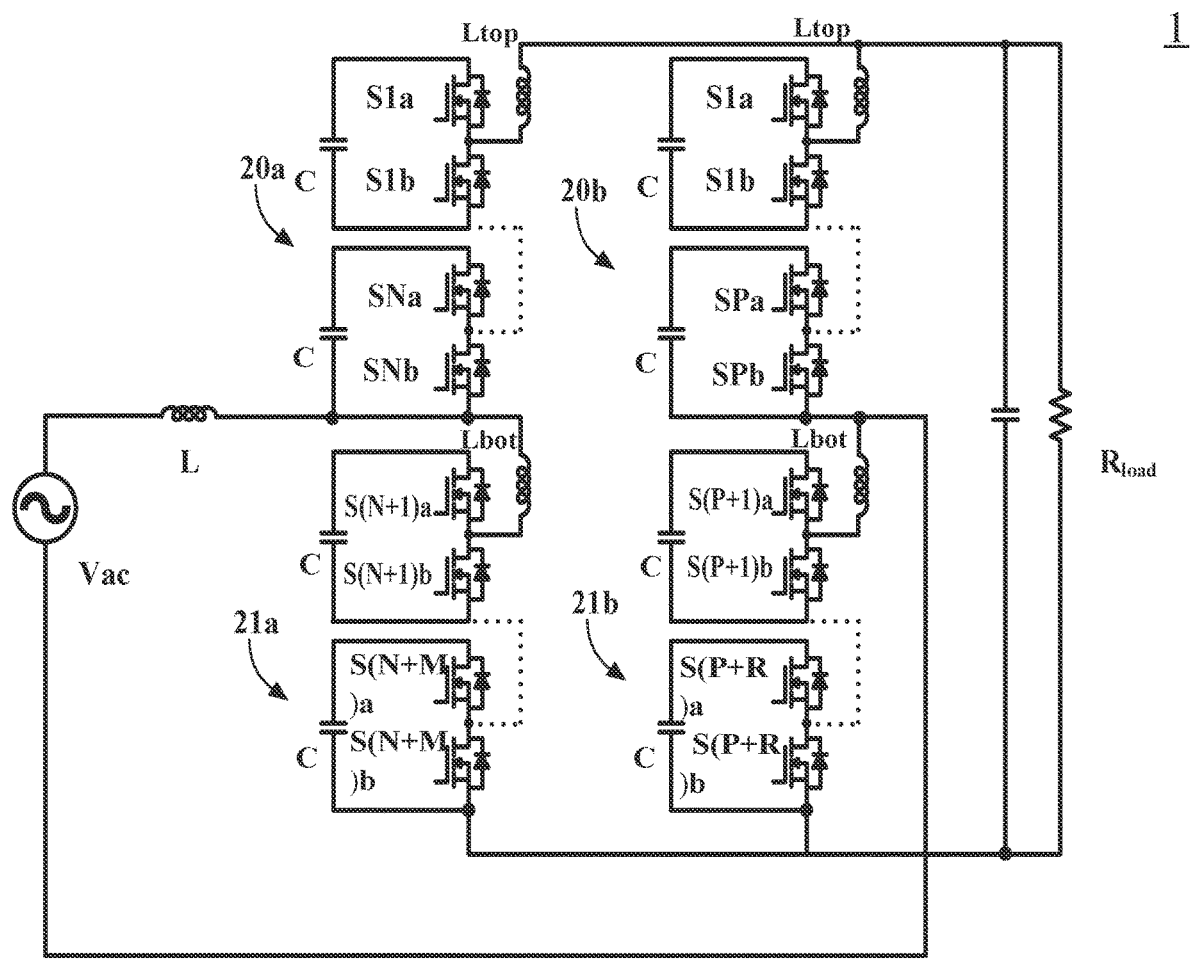
FIG. 11B schematically shows a single-phase power factor correction rectifier applying the proposed modulation schemes in the half-bridge cascaded cells with different number of cells in the top arm and the bottom arm.
Figure 11B:
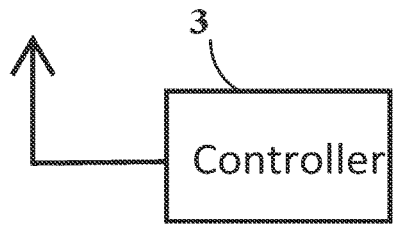

In an embodiment, the number of the HBC cells in the arms in different MMC phase legs may be different. FIG. 11B schematically shows a single-phase power factor correction rectifier applying the proposed modulation schemes in the half-bridge cascaded cells with different number of cells in the top arm and the bottom arm. In this embodiment, one of the two MMC phase legs has N HBC cells in the top arm 20a and M HBC cells in the bottom arm 21a, the other one of the two MMC phase legs has P HBC cells in the top arm 20b and R HBC cells in the bottom arm 21b, wherein N, M, P and R are positive number greater than or equal to 2, and N, M, P and R may be the same or different in the present disclosure.

Figure 12:
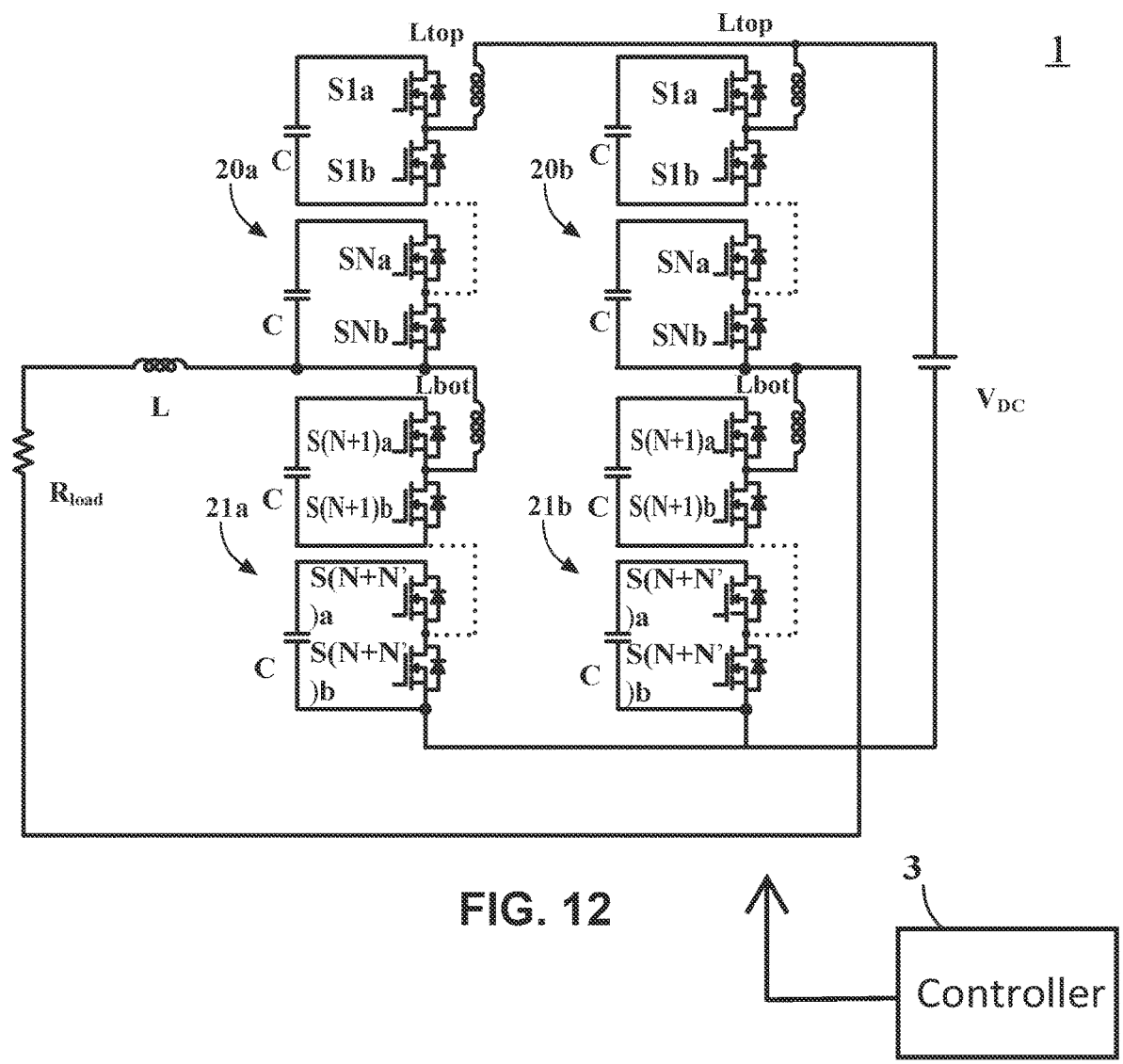
FIG. 12 schematically shows a single-phase inverter applying the proposed modulation schemes in the half-bridge cascaded cells.

FIG. 12 schematically shows a single-phase inverter circuit where two MMC phase legs are used. In FIG. 12, the converter system 1 includes two top arms 20a and 20b and two bottom arms 21a and 21b. The circuit structures and operations of the converter system, the top arms and the bottom arms shown in FIG. 12 are as described above, and the detailed descriptions thereof are omitted herein. The top arms 20a and 20b are connected in series, and the bottom arms 21a and 21b are connected in series, and the bottom arm inductor of the bottom arm 21a and the bottom arm inductor of the bottom arm 21b are electrically connected to a load Rload, and the converter system 1 in FIG. 12 is a DC to AC inverter.

Figure 13A:
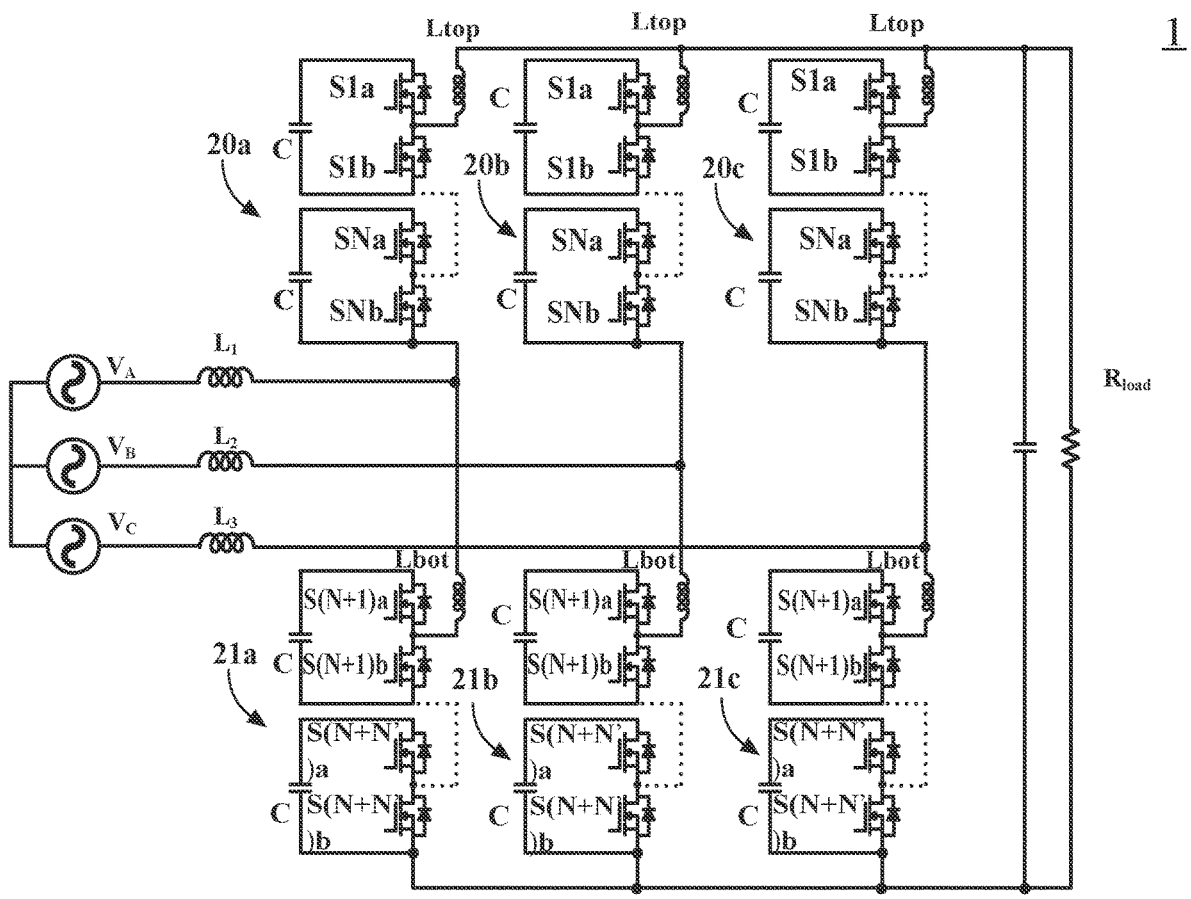
FIG. 13A schematically shows a three-phase power factor correction rectifier applying the proposed modulation schemes in the half-bridge cascaded cells.
Figure 13A:
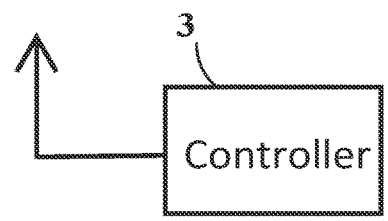

FIG. 13A schematically shows a three-phase PFC circuit where three MMC phase legs are used to block high voltage. FIG. 14 schematically shows a three-phase inverter circuit where three MMC phase legs are used. The proposed modulation scheme can be applied during the switching transition to realize ZVS operation. In FIGS. 13 and 14, the converter system 1 includes three top arms 20a, 20b and 20c and three bottom arms 21a, 21b and 21c. The circuit structures and operations of the converter system, the top arms and the bottom arms shown in FIGS. 13 and 14 are as described above, and the detailed descriptions thereof are omitted herein. In FIG. 13A, the top arms 20a, 20b, and 20c are connected in series, and the bottom arms 21a, 21b, and 21c are connected in series, and the bottom arm inductor of the bottom arm 21a, the bottom arm inductor of the bottom arm 21b, and the bottom arm inductor of the bottom arm 21c are electrically connected to a three-phase AC source respectively, and the converter system 1 in FIG. 13A is a three-phase power factor correction circuit. In FIG. 14, the top arms 20a, 20b, and 20c are connected in series, and the bottom arms 21a, 21b, and 21c are connected in series, and the bottom arm inductor of the bottom arm 21a, the bottom arm inductor of the bottom arm 21b, and the bottom arm inductor of the bottom arm 21c are electrically connected to a three-phase AC respectively, and the converter system 1 in FIG. 14 is a three-phase inverter.

Figure 13B:
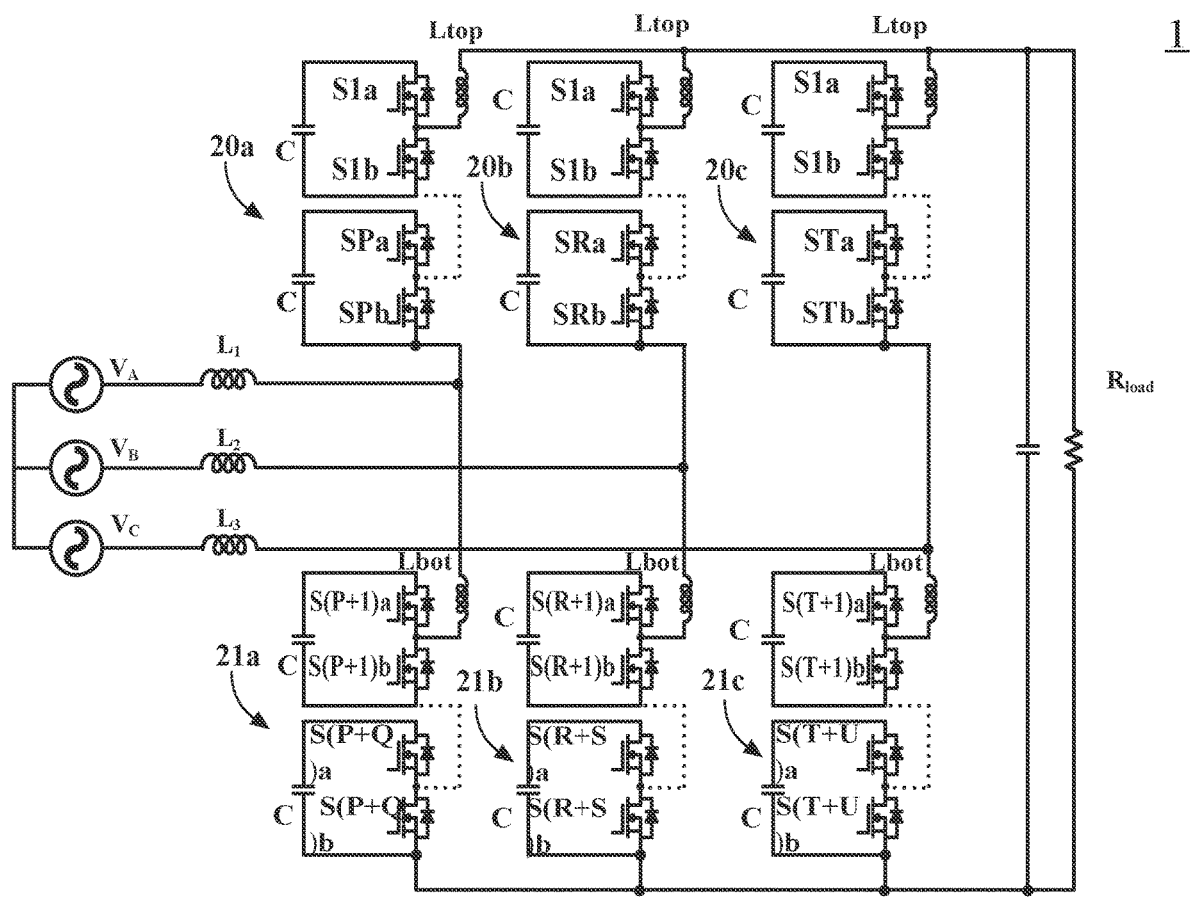
FIG. 13B schematically shows a three-phase power factor correction rectifier applying the proposed modulation schemes in the half-bridge cascaded cells with different number of cells in the top arm and the bottom arm.
Figure 13B:
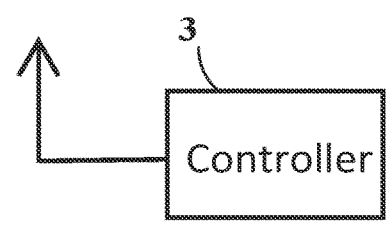

In an embodiment, the number of the HBC cells in the arms in different MMC phase legs may be different. FIG. 13B schematically shows a three-phase power factor correction rectifier applying the proposed modulation schemes in the half-bridge cascaded cells with different number of cells in the top arm and the bottom arm. In this embodiment, one of the three MMC phase legs has P HBC cells in the top arm 20a and Q HBC cells in the bottom arm 21a, another one of the three MMC phase legs has R HBC cells in the top arm 20b and S HBC cells in the bottom arm 21b, the other one of the three MMC phase legs has T HBC cells in the top arm 20c and U HBC cells in the bottom arm 21c, wherein P, Q, R, S, T and U are positive number greater than or equal to 2, and P, Q, R, S, T and U may be the same or different according to design needs in the embodiment of the present disclosure.

In the present disclosure, the converter systems in the present embodiments may be implemented to a buck convert, a boost converter or a bidirectional converter. The operations of the buck convert, the boost converter and the bidirectional converter of the embodiments of the present disclosure are as described above, and the detailed descriptions thereof are omitted herein.

From the above descriptions, the present disclosure provides a converter system, and the controller of the converter system controls the converter system to operate in three different modulation schemes for allowing the switches to achieve ZVS. Therefore, the switching loss is reduced, and the conversion efficiency is increased.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A converter system, comprising:
a positive input terminal and a negative input terminal, configured to receive an input voltage;
a positive output terminal and a negative output terminal, configured to provide an output voltage;
a branch circuit, comprising:
a top arm, comprising N cells and a top arm inductor, wherein the top arm inductor is electrically connected to the positive input terminal and the N cells, wherein each of the N cells of the top arm comprises a first switch, a second switch, and a capacitor connected in series and has a first node between the first switch and the second switch and a second node between the second switch and the capacitor, the second node of the n-th cell of the top arm is connected to the first node of the (n+1)-th cell of the top arm, and each of the N cells of the top arm is configured to generate a cell voltage in each cell of the top arm, wherein N is a positive integer, n is greater than or equal to 1 and is less than N, and the top arm inductor is electrically connected to the first node of the first cell of the top arm; and a bottom arm, comprising N' cells and a bottom arm inductor, wherein each of the N' cells of the bottom arm comprises a third switch, a fourth switch, and a capacitor connected in series and has a third node between the third switch and the fourth switch and a fourth node between the fourth switch and the capacitor, the third node of the n-th cell of the bottom arm is connected to the fourth node of the (n+1)-th cell of the bottom arm, and each of the N' cells of the bottom arm is configured to generate a cell voltage in each cell of the bottom arm, wherein N' is a positive integer, n is greater than or equal to 1 and is less than N', and an end of the bottom arm inductor is electrically connected to the third node of the first cell of the bottom arm, and another end of the bottom arm inductor is electrically connected to the second node of the N-th cell of the top arm, the fourth node of the N'-th cell of the bottom arm is electrically connected to the negative input terminal, the positive output terminal and the negative output terminal are electrically connected to the second node of the N-th cell of the top arm and the fourth node of the N'-th cell of the bottom arm respectively; and a controller configured to generate a plurality of control signals for controlling the switches in each cell in the top arm and the bottom arm respectively, wherein the controller is adapted to control the converter system to operate in first, second, and third modes through the plurality of control signals, wherein in the first mode, the voltage applied to the top arm inductor and the bottom arm inductor is substantial zero, wherein in the second mode, the voltage applied to the top arm inductor and the bottom arm inductor is at least one cell voltage, wherein in the third mode, at least one of the top arm inductor and the bottom arm inductor resonates with at least one capacitor in the top arm and the bottom arm.

2. The converter system according to claim 1, wherein N is equal to N', an amount of the cells of the top arm is equal to an amount of the cells of the bottom arm.

3. The converter system according to claim 1, wherein the top arm inductor and the bottom arm inductor are realized either by a physical inductor or any form of parasitics.

4. The converter system according to claim 1, wherein at least one switch turns on after its voltage reduces to zero during any of the first to third modes.

5. The converter system according to claim 1, wherein a magnitude of the voltage applied to the top arm inductor and the bottom arm inductor in the second mode is M times the cell voltage, wherein M is an integer.

6. The converter system according to claim 1, wherein the converter system further comprises a plurality of said branch circuits electrically connected to each other.

7. The converter system according to claim 1, further comprising a LC filter to form a buck converter.

8. The converter system according to claim 1, wherein the converter system further comprises an inductor and an output capacitor to form a boost converter.

9. The converter system according to claim 1, wherein the converter system is electrically connected to an AC source as a power factor correction circuit.

10. The converter system according to claim 1, wherein the converter system is electrically connected to an AC load as a DC to AC inverter.

11. The converter system according to claim 1, wherein the converter system is electrically connected to a three-phase AC source as a three-phase power factor correction circuit.

12. The converter system according to claim 1, wherein the converter system is electrically connected to a three-phase AC as a three-phase inverter.

* * * * *